United States Patent
Hasegawa et al.

(10) Patent No.: US 11,967,094 B2
(45) Date of Patent: Apr. 23, 2024

(54) DETECTING DEVICE, INFORMATION PROCESSING DEVICE, DETECTING METHOD, AND INFORMATION PROCESSING PROGRAM

(71) Applicant: NIKON CORPORATION, Tokyo (JP)

(72) Inventors: Satoshi Hasegawa, Tokyo (JP); Yoshihiro Nakagawa, Tokyo (JP); Masashi Hashimoto, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 414 days.

(21) Appl. No.: 17/350,803

(22) Filed: Jun. 17, 2021

(65) Prior Publication Data

US 2021/0312647 A1    Oct. 7, 2021

Related U.S. Application Data

(63) Continuation of application No. PCT/JP2019/049798, filed on Dec. 19, 2019.

(30) Foreign Application Priority Data

Dec. 21, 2018    (JP) .................................. 2018-239536

(51) Int. Cl.
*G06T 7/41*    (2017.01)
*G06T 7/529*    (2017.01)
(Continued)

(52) U.S. Cl.
CPC ............... *G06T 7/41* (2017.01); *G06T 7/529* (2017.01); *G06T 7/70* (2017.01); *G06T 7/90* (2017.01)

(58) Field of Classification Search
CPC .. G06T 7/41; G06T 7/529; G06T 7/70; G06T 7/90; G06T 2210/56; G06T 7/50; G06T 15/04; G06T 17/00; G01B 11/24
See application file for complete search history.

(56) References Cited

U.S. PATENT DOCUMENTS 6,424,351 B1 *  7/2002  Bishop .................... G06T 15/04
                                                        345/582
6,525,731 B1 *  2/2003  Suits ....................... G06T 15/04
                                                        345/427
(Continued)

FOREIGN PATENT DOCUMENTS

JP          2010-134546 A     6/2010
WO     WO-2021120846 A1 *    6/2021    ............ G06T 17/00

OTHER PUBLICATIONS

Mar. 10, 2020 International Search Report issued in International Application No. PCT/JP2019/049798.
(Continued)

*Primary Examiner* — Charles T Shedrick
(74) *Attorney, Agent, or Firm* — Oliff PLC

(57) ABSTRACT

To reduce the feel of incongruity in a model, provided is a detection device comprising: a texture detector that detects texture information of a target object from a first position; a position detector that detects depth information to each point in the target object from a second position different from the first position; a region detector that detects a data deficient region in which the depth information has been acquired but the texture information has not been acquired, on the basis of a detection result of the texture detector and a detection result of the position detector; and an adder that adds specific texture information to the data deficient region.

20 Claims, 15 Drawing Sheets

(51) Int. Cl.
    *G06T 7/70*    (2017.01)
    *G06T 7/90*    (2017.01)

(56) References Cited

U.S. PATENT DOCUMENTS

| | | | | |
|---|---|---|---|---|
| 11,321,937 | B1* | 5/2022 | Jiang | G06V 20/647 |
| 2003/0197698 | A1* | 10/2003 | Perry | G06T 17/00 |
| | | | | 345/419 |
| 2003/0198404 | A1* | 10/2003 | Frisken | G06T 7/50 |
| | | | | 382/285 |
| 2011/0242283 | A1* | 10/2011 | Tyagi | G01B 11/2545 |
| | | | | 348/46 |
| 2014/0146139 | A1* | 5/2014 | Schwartz | H04N 13/128 |
| | | | | 348/43 |
| 2014/0219526 | A1* | 8/2014 | Linguraru | G06V 40/20 |
| | | | | 382/128 |
| 2019/0339067 | A1* | 11/2019 | Sanami | G06T 7/55 |
| 2020/0074674 | A1* | 3/2020 | Guo | G06V 10/764 |
| 2020/0099920 | A1* | 3/2020 | Khamis | G06T 7/90 |
| 2021/0217153 | A1* | 7/2021 | Peng | H04N 25/60 |
| 2022/0051431 | A1* | 2/2022 | Jagadeesan | A61B 34/20 |

OTHER PUBLICATIONS

Jun. 16, 2021 International Preliminary Report on Patentability issued in International Application No. PCT/JP2019/049798.

* cited by examiner

DETECTING DEVICE, INFORMATION PROCESSING DEVICE, DETECTING METHOD, AND INFORMATION PROCESSING PROGRAM

CROSS REFERENCE TO RELATED APPLICATION

This is a Continuation of International Application No. PCT/JP2019/049798, filed on Dec. 19, 2019, which claims the priority benefit of Japanese Patent Application No. 2018-239536, filed on Dec. 21, 2018. The contents of the above-mentioned applications are incorporated herein by reference.

FIELD OF THE INVENTION

The present invention relates to a detection device, an information processing device, a detection method, and an information processing program.

BACKGROUND

There have been proposed techniques in which a result of detecting an object is input to a computer to acquire a three-dimensional shape of the object (for example, see Patent Literature 1). However, for example, when detecting the shape information and the texture information of an object (target region), if the position from which the shape information of the object is detected differs from the position from which the texture information is detected, there will be a region within which the shape information has been obtained but the texture information is in deficit. When calculating model information, it is desirable that there be very few such regions having deficiency of texture information.

CITATION LIST

Patent Literature

Patent Literature 1: Japanese Unexamined Patent Application, First Publication No. 2010-134546

SUMMARY

According to an aspect of the present invention, there is provided a detection device including: a texture detector that detects texture information of a target object from a first position; a position detector that detects depth information to each point in the target object from a second position different from the first position; a region detector that detects a data deficient region in which the depth information has been acquired but the texture information has not been acquired, on the basis of a detection result of the texture detector and a detection result of the position detector; and an adder that adds specific texture information to the data deficient region.

According to an aspect of the present invention, there is provided a detection device including: a texture detector that detects texture information of a target region from a first position; a position detector that detects, from a second position different from the first position, depth information to each point in the target region from a predetermined point; a region detector that detects, on the basis of a detection result of the texture detector and a detection result of the position detector, a data deficient region in which the depth information has been acquired but the texture information has not been acquired; and an adder that adds specific texture information to the data deficient region.

According to an aspect of the present invention, there is provided an information processing device including: a region detector that detects, on the basis of a result of detecting texture information of a target object from a first position and a result of detecting depth information to each point in the target object from a second position different from the first position, a data deficient region in which the depth information has been acquired but the texture information has not been acquired; and an adder that adds specific texture information to the data deficient region.

According to an aspect of the present invention, there is provided an information processing device including: a region detector that detects, on the basis of a result of detecting texture information of a target region from a first position and a result of detecting, from a second position different from the first position, depth information to each point in the target region from a predetermined point, a data deficient region in which the depth information has been acquired but the texture information has not been acquired; and an adder that adds specific texture information to the data deficient region.

According to an aspect of the present invention, there is provided a detection method including: detecting texture information of a target object from a first position; detecting depth information to each point in the target object from a second position different from the first position; detecting a data deficient region in which the depth information has been acquired but the texture information has not been acquired, on the basis of a detection result of the texture detector and a detection result of the position detector; and adding specific texture information to the data deficient region.

According to an aspect of the present invention, there is provided a detection method including: detecting texture information of a target region from a first position; detecting, from a second position different from the first position, depth information to each point in the target region from a predetermined point; detecting, on the basis of a result of detecting texture information from a first position and a result of detecting depth information from a second position, a data deficient region in which position information has been detected from the first position but the texture information has not been detected from the second position; and adding specific texture information to the data deficient region.

According to an aspect of the present invention, there is provided an information processing program that causes a computer to execute processes of: detecting, on the basis of a result of detecting texture information of a target object from a first position and a result of detecting depth information to each point in the target object from a second position different from the first position, a data deficient region in which the depth information has been acquired but the texture information has not been acquired; and adding specific texture information to the data deficient region.

According to an aspect of the present invention, there is provided an information processing program that causes a computer to execute processes of: detecting, on the basis of a result of detecting texture information of a target region from a first position and a result of detecting, from a second position different from the first position, depth information to each point in the target region from a predetermined point, a data deficient region in which the depth information has been acquired but the texture information has not been acquired; and adding specific texture information to the data deficient region.

DETAILED DESCRIPTION OF EMBODIMENTS

First Embodiment

Figure 1:
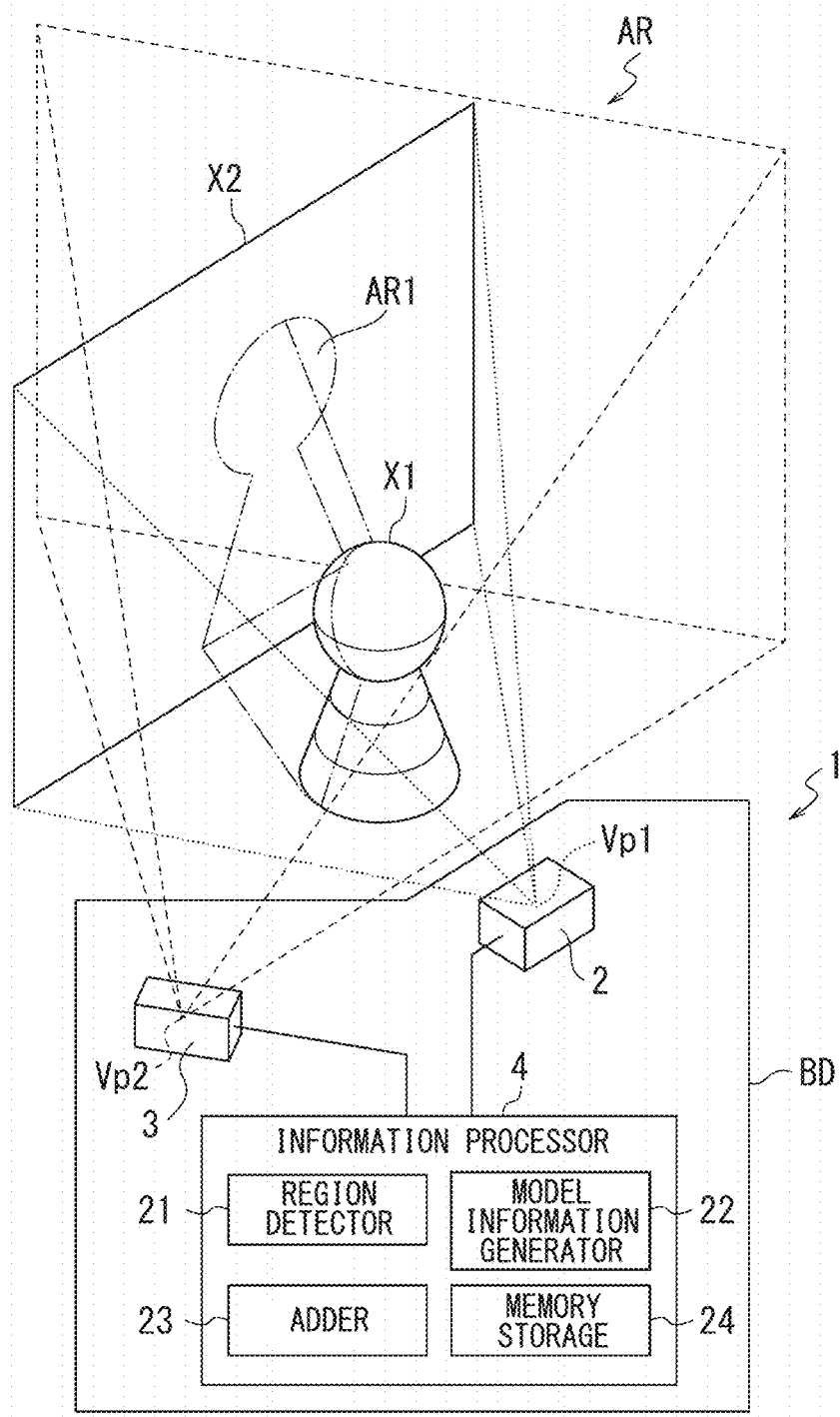
FIG. 1 is a diagram showing an example of a detection device according to a first embodiment.

Hereunder, a first embodiment will be described. FIG. 1 is a diagram showing an example of a detection device 1 according to the first embodiment. The detection device 1 detects information that serves as the basis for model information (for example, three-dimensional CG model data). The detection device 1 detects a target region AR including an object X1 to be modeled. The target region AR includes, for example, the object X1 (first object) to be modeled and an object X2 such as a wall behind the object X1. The object X2 may be a second object to be modeled. Model information includes the shape information and the texture information of the object X1. The shape information includes point cloud data and surface information. The shape information may include depth information.

The detection device 1 optically detects the target region AR. The detection device 1 may include one or both of a camera and a motion capturer. The detection device 1 may include a stationary device (for example, fixed-point camera). The detection device 1 may include a portable device (for example, information terminal, smartphone, tablet, mobile phone with built-in camera, wearable terminal).

The detection device 1 includes an image capturer (texture detector) 2, a position detector (position sensor) 3, and an information processor 4. The detection device 1 detects the target region AR by means of detectors (sensors such as image capturer 2 and position detector 3). The image capturer 2 detects, from a first position Vp1, the target region AR by performing image-capturing. In the present embodiment, the image capturer 2 detects texture information of the target region AR from the first position Vp1. The position detector 3 detects depth information from a predetermined point (for example, second position Vp2) to each point in the target region AR, for a plurality of points on surfaces of the objects (object X1, object X2) in the target region AR. In the present embodiment, the position detector 3 detects depth information of each point in the target region AR from the second position Vp2 different from the first position Vp1. The information processor 4 may execute, on the basis of the depth information at a plurality of points on the surfaces of the objects (object X1, object X2) detected by the position detector 3, a coordinate conversion process to perform conversion into coordinates of the plurality of points. The coordinates of the plurality of points may be used as the position information detected by the position detector 3.

The position detector 3 detects position information including depth information. In the present embodiment, the detection device 1 includes a main body BD, and the image capturer 2 and the position detector 3 are supported (fixed) on the main body BD. The main body BD (supporting member, fixing member) includes a body or a casing, for example. The main body BD may hold (for example, may accommodate) one or both of at least a part of the image capturer 2 and at least a part of the position detector 3. The main body BD may also hold (for example, may accommodate) at least a part of the information processor 4. The first position Vp1 in the image capturer 2 and the second position Vp2 in the position detector 3 are provided in the main body BD. The main body BD may not hold at least one of the image capturer 2, the position detector 3, and the information processor 4. At least one of the image capturer 2, the position detector 3, and the information processor 4 may be provided separately from the main body BD. The detection device 1 need not include the main body BD. In the present embodiment, the target region AR is detected by the detectors (image capturer 2, position detector 3) from a single viewpoint at which the detection device 1 is arranged. This viewpoint includes the first position Vp1 and the second position Vp2 where the image capturer 2 and the position detector 3 are arranged. The detectors (image capturer 2, position detector 3) are arranged according to the optical axis or the detection direction of the light received.

Figure 2:
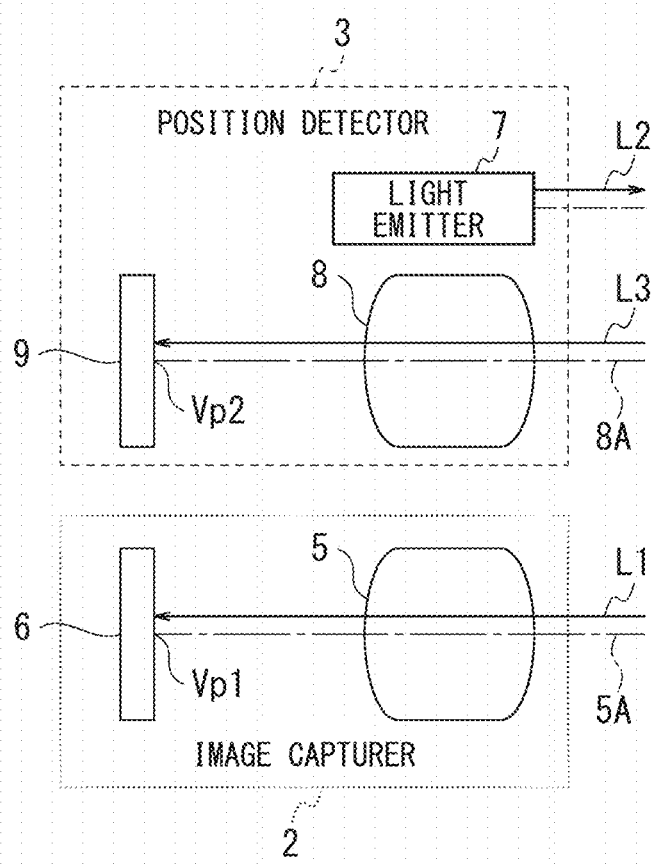
FIG. 2 is a diagram showing an example of a texture detector and a position detector according to the first embodiment.

FIG. 2 is a diagram showing an example of the image capturer 2 and the position detector 3 according to the first embodiment. The image capturer 2 includes an optical system 5 and an image-capturing element 6. Examples of the optical system 5 include an imaging optical system and an image-capturing optical system. Examples the image-capturing element 6 include a CMOS image sensor and a CCD image sensor. The image-capturing element 6 has a plurality of pixels arranged two-dimensionally. The image-capturing element 6 image-captures the target region AR via the optical system 5.

The image capturer 2 detects light L1 (for example, visible light) of a first wavelength band. The image capturer 2 outputs, as texture information, which an image-capturing result (detection result), image data (for example, RGB data)

including color information to the information processor 4. The image data includes, for example, pixel data of each of the plurality of pixels. The pixel data is, for example, data in which a red (R) pixel value, a green (G) pixel value, and a blue (B) pixel value are grouped.

The position detector 3 detects depth information (distance, position information) from a predetermined point (for example, second position Vp2) to each point in the target region AR. The position detector 3 includes, for example, a depth sensor, and detects, as depth information (as position information), the distance between the second position Vp2 (position of position detector 3) and each point in the target region AR (distance measurement data) (for example, depth, perspective, or deepness). For example, the position information includes depth information, but may also include point coordinates (for example, point cloud data described later) and line information or surface information (for example, surface information described later) defined by a plurality of points.

The position detector 3 includes a light emitter 7, an optical system 8, and an image-capturing element 9. The light emitter 7 emits (for example, projects) light L2 (for example, patterned light, irradiating light) of a second wavelength band to a target region AR. The light L2 includes, for example, infrared light, and has a wavelength band different from that of the light L1 detected by the image capturer 2. Examples of the optical system 8 include an imaging optical system and an image-capturing optical system. The image-capturing element 9 is, for example, a CMOS image sensor or a CCD image sensor. The image-capturing element 9 has a plurality of pixels arranged two-dimensionally. The image-capturing element 6 image-captures the target region AR via the optical system 8. The image-capturing element 9 detects light L3 (infrared light, return light) that is radiated from the target region AR as a result of the light L2 being emitted.

The position detector 3 detects the depth to each pixel of the image-capturing element 9 from a point on the target region AR corresponding to each pixel of the image-capturing element 9, on the basis of the pattern of the light L2 emitted from the light emitter 7 (for example, intensity distribution) and the pattern of the light L3 detected by the image-capturing element 9 (intensity distribution, captured image). The position detector 3 outputs, as a detection result, a depth map (for example, depth image, perspective information, position information) representing the distribution of depth in the target region AR, to the information processor 4. In FIG. 2, an optical axis 5A of the optical system 5 of the image capturer 2 is different from an optical axis 8A of the optical system 8 of the position detector 3. In such a case, the viewing field of the image capturer 2 (first position Vp1, first viewing field, image-capturing range, detection range) is different from the viewing field of the position detector 3 (second position Vp2, second viewing field, detection range) (for example, some regions of the viewing fields overlap and some do not).

Figure 3:
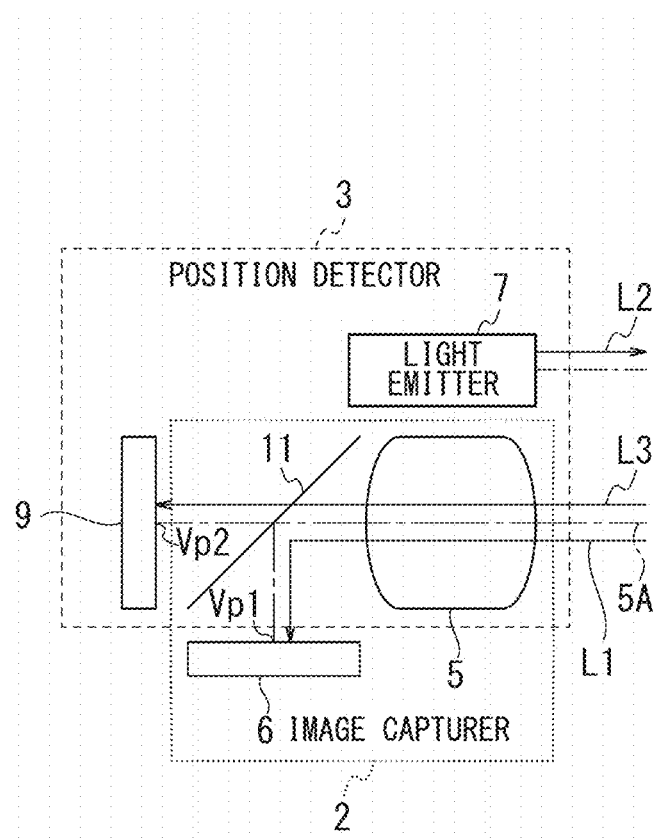
FIG. 3 is a diagram showing another example of the texture detector and the position detector according to the first embodiment.

The image capturer 2 according to the embodiment may have the same optical axis as that of the position detector 3. FIG. 3 is a diagram showing another example of the image capturer 2 and the position detector 3 according to the first embodiment. As shown in FIG. 3, the image capturer 2 includes, for example, the optical system 5, a dichroic mirror 11, and the image-capturing element 9. The optical system 5 is shared by the image capturer 2 and the position detector 3. The dichroic mirror 11 reflects the light L1 of the first wavelength band, and transmits the light L3 of the second wavelength band, which is different from the first wavelength band (light L1). The image-capturing element 6 detects the light L1 reflected on the dichroic mirror 11, by means of image-capturing. The image-capturing element 9 detects the light L3 transmitted by the dichroic mirror 11 by means of image-capturing. The viewing field of the image capturer 2 is substantially the same as that of the position detector 3, for example.

The position detector 3 may be a device that detects depth information by means of a TOF (time of flight) method. The position detector 3 may also be a device that detects depth information by means of a method other than the TOF (time of flight) method. The position detector 3 may also be a device that includes a laser scanner (for example, laser distance measurer) and detects depth information by means of laser scanning. The position detector 3 may also be a device that includes a phase difference sensor and detects depth information by means of a phase difference method. The position detector 3 may also be a device that detects depth information by means of a DFD (depth from defocus) method.

The position detector 3 may be a device that detects depth information by means of triangulation, using captured images captured on a stereo camera or the like from a plurality of viewpoints. In such a case, the position detector 3 may use a captured image captured by the image capturer 2 as an image captured from one position. The position detector 3 may be a device that detects depth information (position information), combining two or more of the plurality of detection methods mentioned above. The position detector 3 may detect depth information of the target region AR by means of a method other than optical methods (for example, ultrasonic wave scanning).

Returning to the description of FIG. 1, the viewing field of the image capturer 2 differs from the viewing field of the position detector 3 in the case of the configuration shown in FIG. 2, for example. A first detection range (first viewing field, image-capturing range) of the image capturer 2 differs from a second detection range (second viewing field) of the position detector 3. Here, when detection range differs between the image capturer 2 and the position detector 3 (or when the first detection range includes a region hidden behind the object X1), a data deficient region (for example, occluded region, shielded region) AR1, in which the texture information obtained by the image capturer 2 is partially missing, may in some cases be present in the target region AR.

Figure 4:
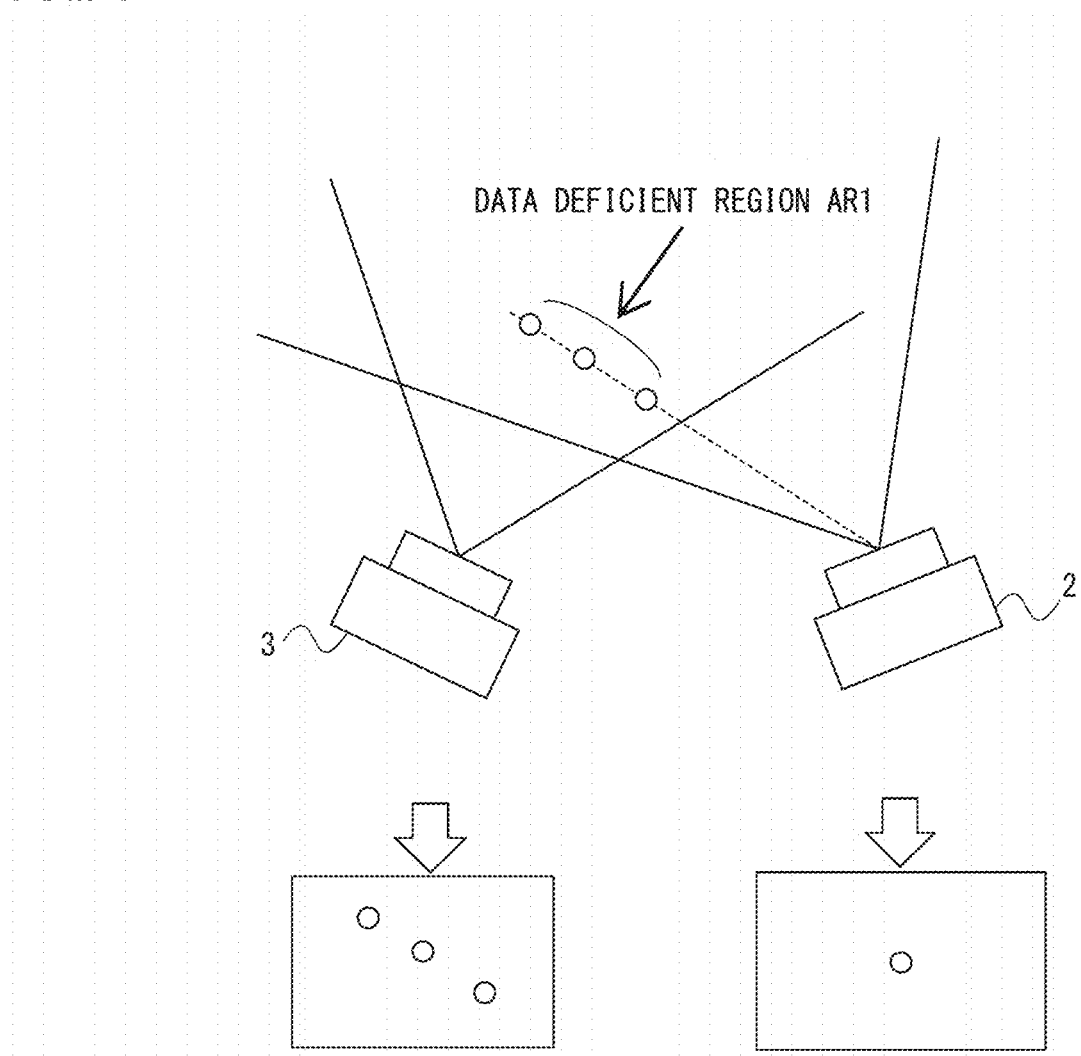
FIG. 4 is a diagram showing an example of a relationship between the texture detector and the position detector, and a data deficient region according to the first embodiment.

FIG. 4 is a diagram showing an example of a relationship between the image capturer (texture detector) 2 and the position detector 3, and a data deficient region according to the first embodiment. As shown in FIG. 4, when the optical axis of the image capturer 2 and the optical axis of the position detector 3 are different, points on the basis of the depth information detected by the position detector 3 may, in some cases, line up on the same vector as viewed from the optical axis (viewpoint, position) of the image capturer 2. As a result, the correspondent relationship between each point and the texture information becomes unclear. That is to say, when detection range differs between the image capturer 2 and the position detector 3 (or when the first detection range includes a region hidden behind the object X1), the data deficient region (for example, texture deficient region) AR1, in which the texture information obtained by the image capturer 2 is partially missing, may in some cases be present in the target region AR. In the data deficient region AR1, data from the position detector 3 (example, position information, depth information data) has been acquired (detected), however, data from the image capturer (example, image data, pixel data) has not been acquired (detected) (even if data has been obtained, it includes a region with a small amount of data). The data deficient region AR1 includes, for example, a region hidden behind the object X1 from the first position Vp1. The data deficient region AR1 includes, for example, a region remaining after excluding a region that can be seen from the first position Vp1 from the surface region of the object X1.

Figure 5:
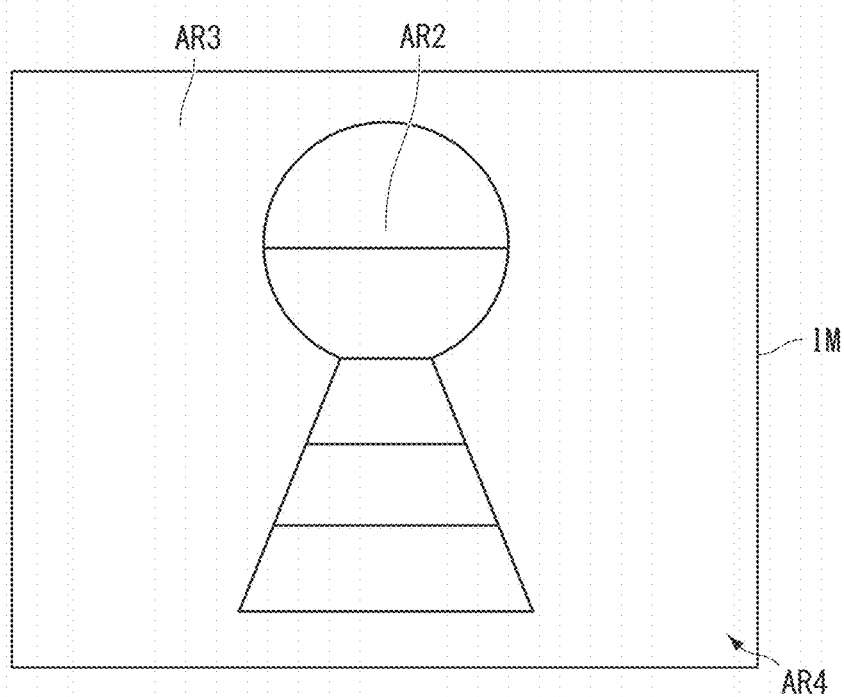
FIG. 5 is a diagram showing an example of a captured image and a depth detection result according to the first embodiment.
Figure 5:
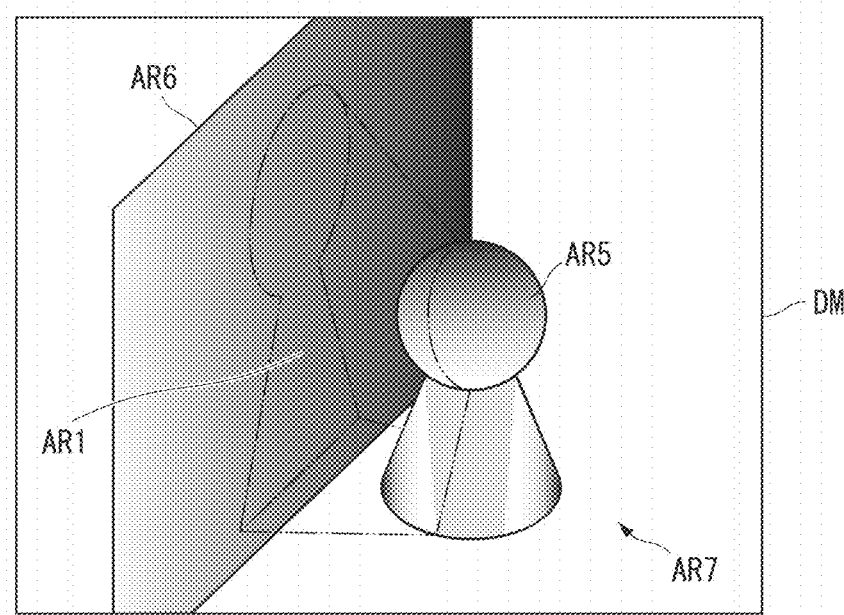

FIG. 5 is a diagram showing a captured image IM and a detection result of depth information according to the first embodiment. In FIG. 5, reference sign DM denotes a depth map (depth image, depth information, perspective information, data of a plurality of depths) corresponding to detection results of position information. The depth map DM is represented by, for example, data of an image format. The depth map DM is stored in the memory storage (see FIG. 1). The pixel value of each pixel in the depth map DM represents, for example, the depth (distance) from a region in the real space region corresponding to the pixel on the depth map DM to the position detector 3. The depth map DM is represented in grayscale, for example. In the depth map DM, a relatively darker (lower pixel value) region indicates that the distance thereto from the position detector 3 is longer (greater in depth) than a relatively lighter (higher pixel value) region.

The captured image IM is, for example, a full-color image. Reference sign AR2 denotes a data acquisition region corresponding to the object X1 on the captured image IM. The data acquisition region AR2 includes the object X1 shown in the captured image IM. Reference sign AR3 denotes a data acquisition region corresponding to the object X2 on the captured image IM. The data acquisition region AR3 includes the object X2 shown in the captured image IM.

Here, in the captured image IM, each pixel belonging to the data deficient region AR1 has no RGB data. The data deficient region AR1 includes a region in which RGB data is not present in the captured image IM and depth information (position information) is present in the depth map DM. The data deficient region AR1 is a region in which captured image data (for example, RGB data) cannot be obtained from the image capturer 2 (see FIG. 1), and depth information (for example, measured value, detection result) can be obtained from the position detector 3 (see FIG. 1).

In the captured image IM, the region remaining after excluding the data deficient region AR1 is the data acquisition region AR4. The data acquisition region AR4 includes a region in which captured image data (for example, RGB data) can be obtained from the image capturer (see FIG. 1), and also depth information (for example, measured value, detection result) can be obtained from the position detector 3 (see FIG. 1). The data acquisition region AR4 includes, for example, a region of the detection range (viewing field, image-capturing range) of the image capturer 2 that overlaps with the detection range (viewing field) of the position detector 3. The data acquisition region AR4 includes a region in which captured image data (for example, RGB data) can be obtained from the image capturer 2, and depth information (for example, measured value, detection result) cannot be obtained from the position detector 3.

In the depth map DM, reference sign AR5 denotes a data acquisition region corresponding to the object X1 (see FIG. 1). Reference sign AR6 denotes a data acquisition region corresponding to the object X2 (see FIG. 1). In the data acquisition region AR5 in the depth map DM, the depth information (position information) of the surface of the object X1 is present, however, the depth information (position information) corresponding to the region hidden behind (on the back side of) the object X1 as viewed from the position of the position detector 3 (second position Vp2 in FIG. 1) is not present.

Note that the data deficient region AR1 may, in some cases, be present due to the difference in illumination (such as illumination intensity, illumination angle), positional displacement, and so forth, even if the image capturer 2 and the position detector 3 are at the same position as in FIG. 3, for example. For example, the detection range (image-capturing range) of the image capturer 2 is illuminated by illumination light (for example, visible light) such as natural light, ambient light, and room light. The detection range of the position detector 3 is illuminated by, for example, the light emitted from the light emitter 7 (for example, infrared light). In such a case, for example, of the region that is illuminated within the detection range of the position detector 3, the region that is not illuminated within the detection range of the image capturer 2 (for example, the region hidden behind part of the object) is a data deficient region AR1.

The data deficient region AR1 may, in some cases, be present depending on the difference in wavelength between the light detected by the image capturer 2 (for example, visible light) and the light detected by the position detector 3 (for example, infrared light). For example, the data deficient region AR1 may, in some cases, occur as a result of the optical characteristics (for example, reflectance, transmittance, absorptance) within the target region AR being different depending on the wavelength band of the detected light. For example, a region in which infrared light is reflected and visible light is absorbed is a data deficient region AR1 where data can be obtained from the position detector 3 but data cannot be easily obtained from the image capturer 2.

Returning to the description of FIG. 1, the information processor 4 (information processing device) according to the embodiment adds specific texture information to the data deficient region AR1 on the basis of the depth information (position information) of each point or each portion in the data deficient region AR1 as described above. The specific texture information added by the information processor 4 is used, for example, for modeling the data deficient region AR1. The information processor 4 is communicably connected to each of the image capturer 2 and the position detector 3. As an image-capturing result (detection result), the image capturer 2 outputs the data of the captured image IM (see FIG. 5) of the target region AR, for example, as texture information, to the information processor 4. As a detection result, the position detector 3 outputs, for example, the depth map DM of the target region AR (see FIG. 5) to the information processor 4. The information processor 4 adds the specific texture information to the data deficient region AR1 on the basis of the data of the captured image IM output from the image capturer 2 and the depth map DM output from the position detector 3.

The information processor 4 includes a region detector 21, a model information generator 22, an adder 23, and a memory storage 24. The region detector 21 detects (for example, identifies, extracts) the data acquisition region AR4 and the data deficient region AR1 on the basis of the captured image IM captured by AR the image capturer 2 and the detection results of the position detector 3. In the following description, the process of detecting (for example, identifying, extracting) the data acquisition region AR4 and the data deficient region AR1 is referred to as region detection process where appropriate.

The region detector 21 associates depth information (position information) on the depth map DM with position information on the captured image IM on the basis of the relative positions of the image capturer 2 and the position detector 3, and detects the data deficient region AR1. For example, the region detector 21 identifies the relative positions of a region on the captured image IM and a region on the depth map DM by means of nomography transformation (projective transformation, perspective transformation) on the basis of the image capturer 2 and the position detector 3.

In the region detection process, the region detector 21 determines, among points the distance from which to the line connecting a point of the target region AR and the first position (Vp1) is less than or equal to a threshold value, points other than the one that is closest to the first position (Vp1) as being points belonging to the data deficient region AR1. The region detector 21 detects the data deficient region AR1 on the basis of the distance from the second position (Vp2) to each point of the target region AR, which is detected as position information by the position detector 3. The region detector 21 detects the data deficient region AR1 on the basis of the distance (coordinate) from the second position (Vp2) to each point of the target region AR, which is detected as depth information by the position detector 3.

In the region detection process, for each region (for example, one or more positions) on the depth map DM, the region detector 21 determines whether or not the corresponding region is present on the captured image IM. If the corresponding region is present on the captured image IM for a region (for example, one or more positions) selected from the depth map DM, the region detector 21 determines this region as being included in the data acquisition region AR5. If the corresponding region is not present on the captured image IM for a region (for example, one or more positions) selected from the depth map DM, the region detector 21 determines this region as being included in the data deficient region AR1. In the depth map DM, the data acquisition region AR7 is a region that has been detected as depth information (position information) by the position detector 3 from the second position (Vp2), and includes a region that is not present on the captured image IM.

The model information generator 22 generates model information, using an image-capturing result of the image capturer 2 and a detection result of the position detector 3. In the present embodiment, The model information generated by the model information generator 22, since on the basis of the results of detection performed from separate single positions (for example, positions where the axes (for example, optical axes) of detecting the object X1, or positions where the axes (for example, optical axes) of detecting the object X are not parallel to each other) in the image capturer 2 and the position detector 3 (on the basis of the results of the detectors of the detection device 1 each arranged at a separate single viewpoint), lacks data (depth information, texture information) of part of the entire circumference of the object X1. When visualizing such partially deficient model information (for example, when performing a rendering process), if incongruent texture information is added to the data deficient region AR1, the entire model information is rendered incongruent or the visual quality thereof becomes impaired, resulting in a reduction in the utility value thereof. In the present embodiment, by adding specific texture information (predetermined texture information) described later to the data deficient region AR1, it is possible to reduce unnaturalness in the model information as a whole, or to suppress the visual quality thereof from being deteriorated. After the data deficient region AR1 has been identified, the model information generator 22 may generate model information that visualizes (for example, performs a rendering process on) the data deficient region AR1 in an emphasized manner by coloring the portion of the identified data deficient region AR1 or the boundary of this portion (or surrounding it with lines) or by displaying it in gradation.

The model information generator 22 performs computer graphics processing (CG processing) on at least part of an object in the target region AR to calculate model information (for example, three-dimensional CG model data). The model information includes at least one of the shape information and the texture information of an object in the target region AR. The model information generator 22 associates the shape information in the data deficient region AR1 on the basis of the position information detected by the position detector 3, the texture information on the basis of the image-capturing result of the image capturer 2, and the specific texture information added to the data deficient region AR1 by the adder 23 described later, to generate the model information.

The model information generator 22 executes point cloud data processing for calculating point cloud data as shape information. The point cloud data includes three-dimensional coordinates of a plurality of points on objects (such as the object X1 and the object X2) in the target region AR. The model information generator 22 may use the detection results of the position detector 3 (for example, depth measured values) to calculate point cloud data in the data acquisition region AR7 (see FIG. 5).

The model information generator 22 may calculate point cloud data for a part of the data acquisition region AR7. Point cloud data other than that of a part of the data acquisition region AR7 may be calculated by a processor (for example, second model information generator) different from the model information generator 22. For example, point cloud data of the entire data acquisition region AR7 may be acquired by combining the point cloud data calculated by the model information generator 22 and the point cloud data calculated by the second model information generator.

The model information generator 22 reads out the data of the depth map DM from the memory storage 24, and calculates point cloud data by performing perspective transformation or the like from the depth map DM into a planar image. For example, the model information generator 22 connects a first pixel (first point on an object) corresponding to predetermined depth information and a second pixel (second point on the object) adjacent to the first pixel. As for a third pixel (third point on the object) adjacent to the second pixel, the model information generator 22 connects the second pixel and the third pixel also in a similar manner. As described above, the model information generator 22 calculates point cloud data having predetermined depth information on the basis of pixels by sequentially connecting adjacent pixels corresponding to the predetermined depth information. The model information generator 22 then stores the calculated point cloud data in the memory storage 24.

The model information generator 22 executes surface processing for calculating surface information as shape information. The surface information includes, for example, at least one of polygon data, vector data, and draw data. The surface information includes coordinates of a plurality of points on the surface of an object and connection information between the plurality of points. The connection information (for example, attribute information) includes, for example, information that mutually associates points at both ends of a line corresponding to the ridge line (for example, edge) of an object surface. The connection information includes, for example, information that mutually associates a plurality of lines corresponding to outlines of the object surface (surface).

In the surface processing, the model information generator 22 estimates a surface between a point selected from the plurality of points included in the point cloud data and a point in the vicinity thereof. The model information generator 22, in the surface processing, converts point cloud data into polygon data having plane information between points. For example, the model information generator 22 converts point cloud data into polygon data by means of an algorithm using a least squares method, for example. This algorithm may be one to which an algorithm published in the point cloud processing library is applied, for example. The model information generator 22 then stores the calculated surface information in the memory storage 24.

The model information generator 22 also generates texture information of a surface defined by three-dimensional point coordinates and information related thereto. The texture information includes, for example, at least one of following information: characters/figures on the object surface; information that defines markings, textures, patterns, and asperity; a specific image; and a color (for example, chromatic color, achromatic color). The model information generator 22 stores the generated texture information in the memory storage 24.

The model information generator 22 may generate, as model information, spatial information (for example, lighting condition, light source information) of an image. The light source information includes, for example, at least one of: the position of a light source emitting illumination light with respect to an object (target object; the direction in which the light is emitted from the light source to the object (light emission direction); the wavelength of the light emitted from this light source; and the type of the light source. The model information generator 22 may use, for example, a model assuming Lambertian reflection, a model including Albedo estimation, or the like, to calculate light source information. The model information generator 22 stores at least part of the generated (for example, calculated) model information in the memory storage 24. The model information generator 22 need not generate part of the model information mentioned above.

The adder 23 that adds specific texture information to the data deficient region AR1 detected by the region detector 21. The adder 23 is a supplementing unit that supplements specific texture information for the data deficient region AR1, or a complementing unit that complements specific texture information for the data deficient region AR1. In the case where, in the depth information (position information) of the respective points detected by the position detector 3 (see FIG. 4), a plurality of points are present on a line that begins at the first position (Vp1), the data deficient region AR1 includes several of the points except for the one that is closest to the first position (Vp1). The adder 23 adds specific texture information to the region that is defined by the several points included in the data deficient region AR1. In such a case, for example, in the present embodiment, on the model information, texture information is applied only to the surface created at the foremost point as viewed from the RGB viewpoint on the basis of depth information, and specific texture information (for example, white, gray) of a predetermined pattern is applied to the other surfaces.

The adder 23 executes a texture addition process to add the specific texture information to the data deficient region AR1. The specific texture information differs from the texture information of the object (for example, object X1) detected by the image capturer 2. The specific texture information may be predetermined specific texture information, or may be generated by the adder 23 according to the data deficient region AR1.

The predetermined specific texture information may be on the basis of information that is stored in the memory storage 24 before the image capturer 2 captures the object. The specific texture information may be selected by the adder 23 from one or more specific texture information candidates stored in the memory storage 24. The specific texture information may be the same common texture information predetermined for a plurality of data deficient regions. By using the specific texture information stored in the memory storage 24, the load required in the texture addition process performed by the adder 23 can be reduced. The specific texture information includes any one of or a combination of some of gray (for example, 18% gray in grayscale), white, black, and a single color. The specific texture information may be a color other than white, for example, when the texture (RGB data) of the object X1 is white. The specific texture information may be a color or a pattern that emphasizes the boundary between an object on the front side (for example, object X1) and an object on the rear side (for example, object X2) (that is, a color or pattern that makes clear distinction of object X1 from object X2). The specific texture information may have a gradation set therein. In the case where a gradation is set in the specific texture information, for example, the side closer to the object (for example, object X1) may be set darker, or the side farther from the object (for example, object X1) may be set darker.

When generating specific texture information, the adder 23 may generate specific texture information that complements, with a gradation, the space between points in the point cloud data where RGB data is present. On the basis of the entire RGB image of the captured image IM captured by the image capturer 2 from the first position Vp1, or of the information of the object X2 remaining after excluding the information of the object X1 from the RGB image, the adder 23 may take any one of brightness, saturation, and hue, or the average of some thereof to generate the specific texture information (for example, texture information of a single color). On the basis of the information of the object X2 remaining after excluding the information of the object X1 from the RGB image of the captured image IM captured from the first position Vp1, the adder 23 may use the color (for example, RGB data) of the point in the vicinity of the data deficient region AR1 (point in the point cloud data where RGB data is present) to generate the specific texture information.

Figure 6:
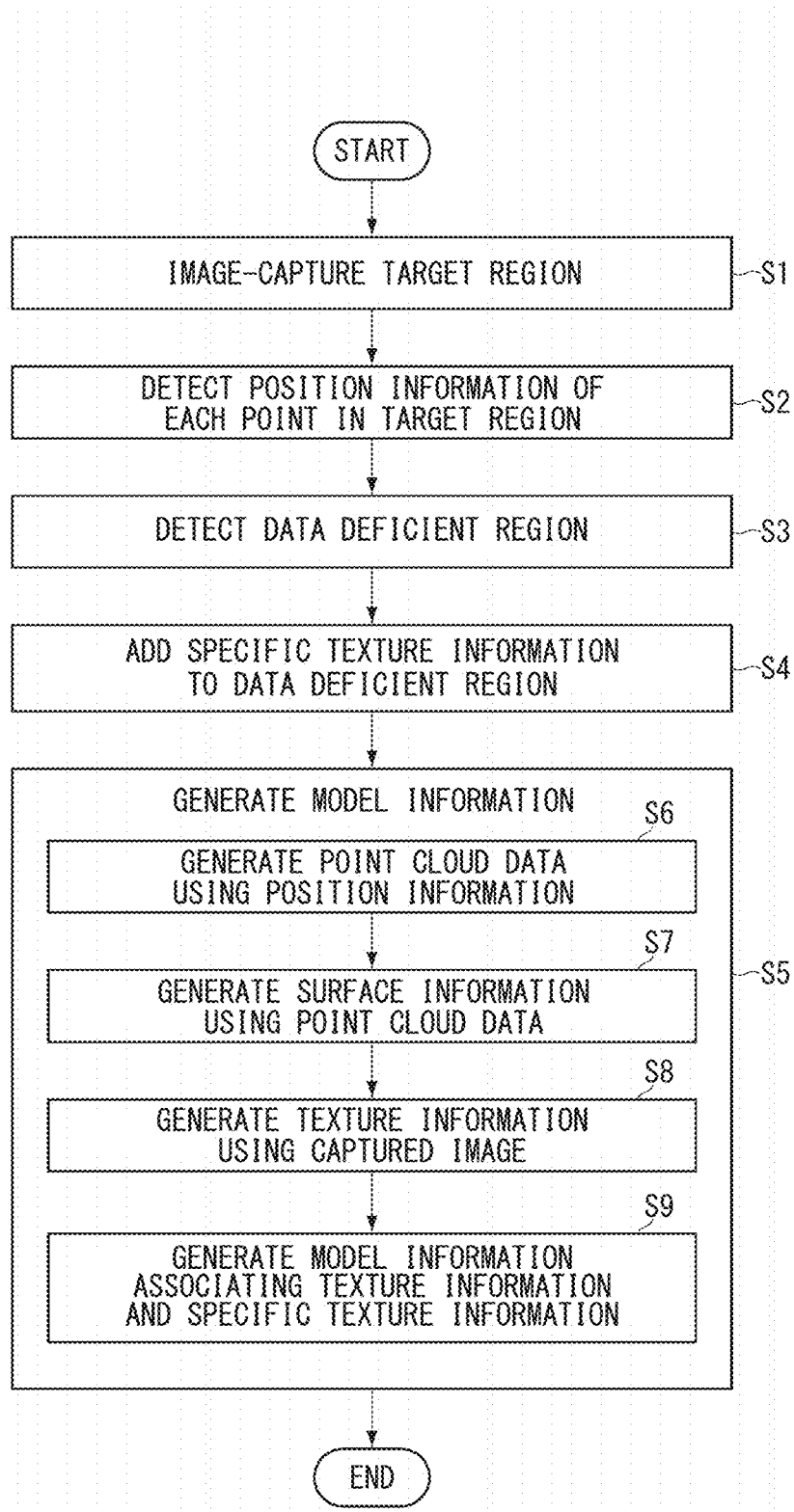
FIG. 6 is a flowchart showing a detection method according to the first embodiment.

Next, a detection method according to the embodiment will be described on the basis of operations of the detection device 1 according to the embodiment. FIG. 6 is a flowchart showing the detection method according to the first embodiment. Appropriate reference will be made to FIG. 1 for each part of the detection device 1. In Step S1, the image capturer 2 image-captures the target region AR including the object X1. In Step S2, the position detector 3 detects depth information (position information) from a predetermined point to each point of the target region AR. Note that the process of Step S2 may be executed prior to the process of Step S1. The process of Step S2 may be executed in parallel with part of the process of Step S1.

In Step S3, the region detector 21 executes the region detection process to detect the data deficient region AR1. The region detector 21 detects the data deficient region AR1 on the basis of the image-capturing result (detection result) of the image capturer 2 obtained in Step S1 and the detection result of the position detector 3 obtained in Step S2. In Step S3, the region detector 21 may execute the region detection process to detect the data acquisition region AR4 and the data deficient region AR1.

In Step S4, the adder 23 adds specific texture information to the data deficient region AR1. The specific texture information differs from the textures of the objects (for example, objects X1, X2). The adder 23 selects, for example, specific texture information to be assigned to the data deficient region AR1 from the specific texture information candidates stored in the memory storage 24. In Step S4, the adder 23 may read out preliminarily defined specific texture information from the memory storage 24 and identify specific texture information for the data deficient region AR1, or may determine, on the basis of the RGB data of the data acquisition region AR4, specific texture information that should be assigned to the data deficient region AR1 and select it from a plurality of specific texture information candidates stored in the memory storage 24.

In Step S5, the model information generator 22 generates model information. In Step S5, the processes of Step S6 to Step S9 are executed, for example. In Step S6, the model information generator 22 generates point cloud data as model information. In Step S7, the model information generator 22 generates surface information as model information, using the point cloud data generated in Step S6. In Step S8, the model information generator 22 generates texture information, using the captured image obtained from the image capturer 2. In Step S9, the model information generator 22 generates model information in which shape information such as point cloud data is associated with texture information and specific texture information.

Figure 7:
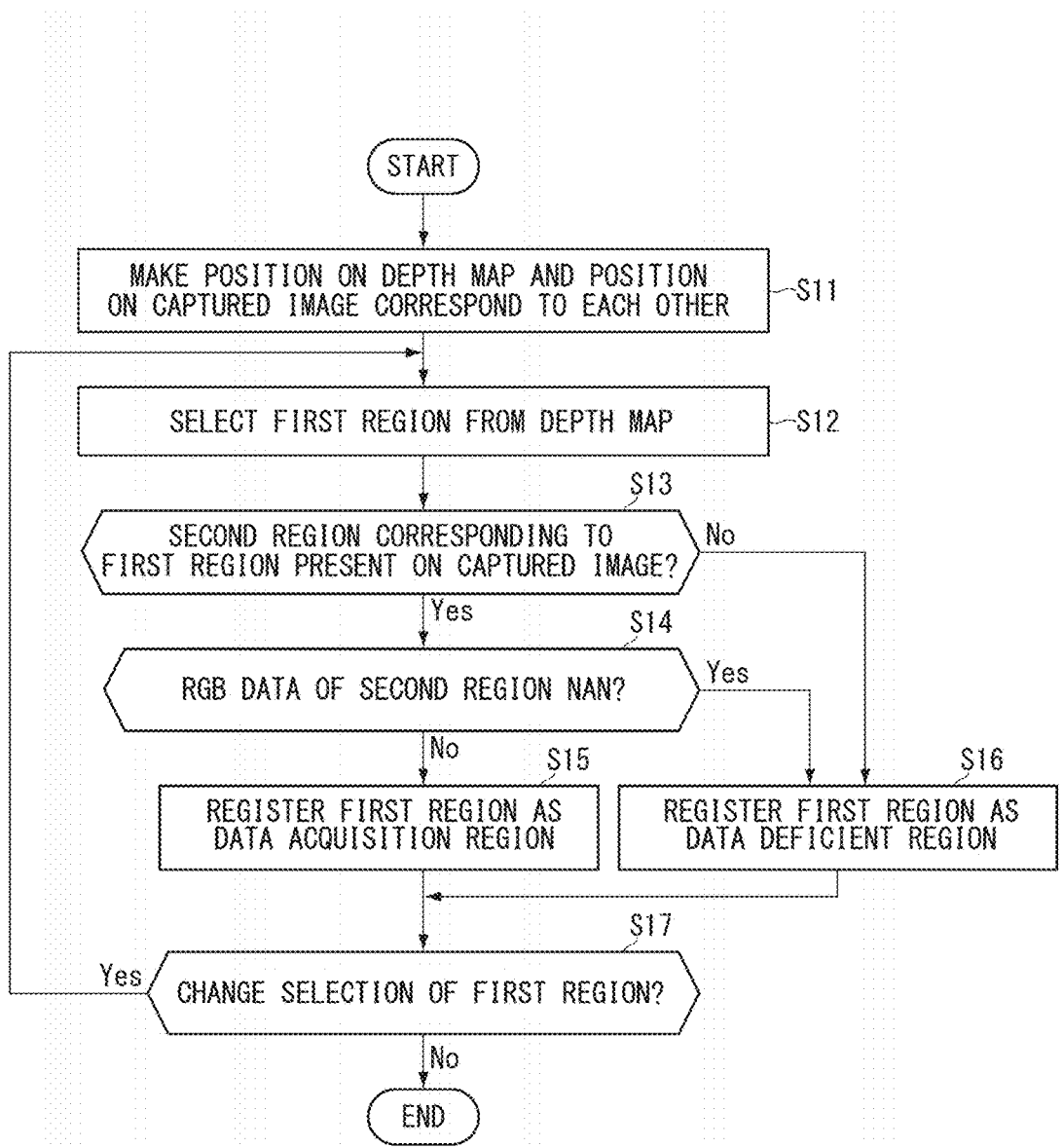
FIG. 7 is a flowchart showing a region detection process according to the first embodiment.

Next, the process of Step S3 of FIG. 6 will be described with reference to FIG. 7. FIG. 7 is a flowchart showing the region detection process according to the first embodiment. In Step S11, the region detector 21 (see FIG. 1) associates a position on the depth map DM with a position on the captured image IM. In Step S12, the region detector 21 selects a region (referred to as a first region where appropriate) from the depth map DM. In Step S13, the region detector 21 determines whether or not a region (referred to as a second region where appropriate) corresponding to the first region is present on the captured image IM.

If the second region corresponding to the first region is determined as being present on the captured image IM (Step S13; Yes), the region detector 21 determines in Step S14 whether or not the RGB data of the second region is NAN. The RGB data being "NAN" means that RGB data is not present (Not A Number). If the RGB data of the second region is determined as not being NAN (has a significant value) (Step S14; No), the region detector 21 registers the first region as a region belonging to the data acquisition region AR4 in Step S15.

If the second region corresponding to the first region is determined as being not present on the captured image IM in Step S13 (Step S13; No), or if the RGB data of the second region is determined as being NAN in Step S14 (Step S14; Yes), the region detector 21 registers the first region as a region belonging to the data deficient region AR1.

After the process of Step S15 or the process of Step S16, the region detector 21 determines whether or not to change the selection of the first region in Step S17. For example, for some scheduled regions on the depth map DM, if the detection of whether the region belongs to the data acquisition region AR4 or the data deficient region AR1 (Step S15 or Step S16) is determined as not having been completed, the region detector 21 determines to change the selection of the first region (Step S17; Yes). If the selection of the first region is determined to be changed (Step S17; Yes), the region detector 21 returns to the process of Step S12, selects the next region (first region) from the depth map DM, and repeats the subsequent processing.

In Step S17, for all scheduled regions on the depth map DM, if the detection of whether the region belongs to the data acquisition region AR4 or the data deficient region AR1 (Step S15 or Step S16) is determined as having been completed, the region detector 21 determines not to change the selection of the first region (Step S17; No). If the selection of the first region is determined not to be changed (Step S17; No), the region detector 21 stores information that distinguishes the data deficient region AR1 and the data acquisition region AR4 from each other in the memory storage 24 (see FIG. 1), and ends the series of processes. The information that distinguishes the data deficient region AR1 and the data acquisition region AR4 from each other is flag data such that, for example, for each depth information (position information) on the depth map DM, "0" indicates that the region belongs to the data deficient region AR1, and "1" indicates that the region belongs to the data acquisition region AR4.

Figure 8A:
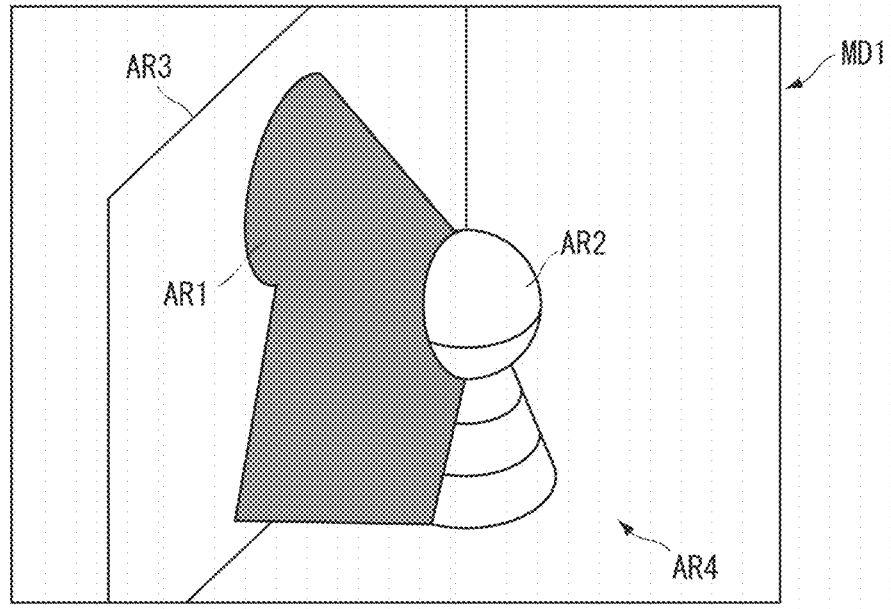
FIG. 8A is a diagram showing an example of displaying model information according to the first embodiment.
Figure 8B:
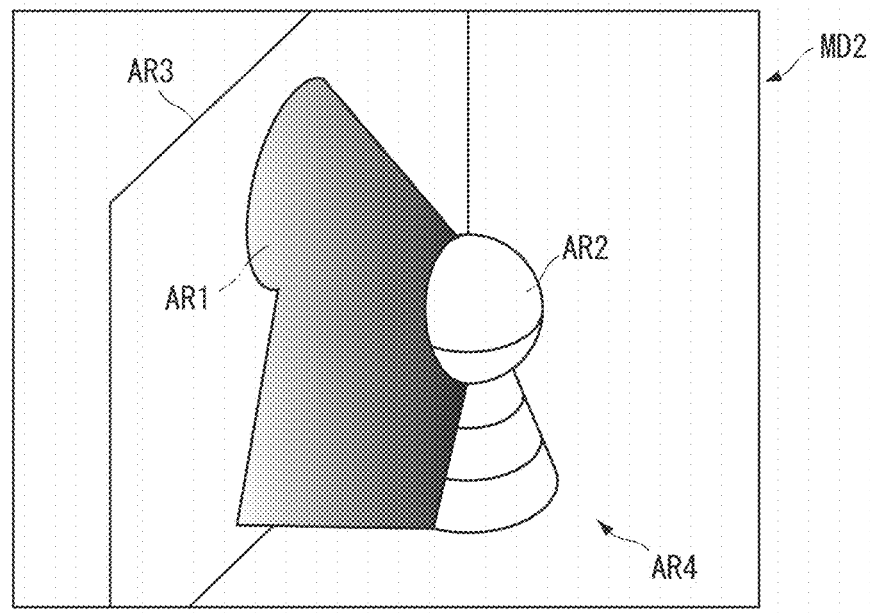
FIG. 8B is a diagram showing another example of displaying the model information according to the first embodiment.

By executing the series of processes shown in FIG. 6 and FIG. 7, model information as shown in FIG. 8 is generated. FIG. 8A is a diagram showing an example of displaying the model information according to the first embodiment, and FIG. 8B is a diagram showing another example of displaying the model information according to the first embodiment. FIG. 8A and FIG. 8B show examples respectively in which model information MD1, MD2 are displayed as CG images on the screen of a display.

If the adder 23 has added specific gray specific texture information to the data deficient region AR1, as shown in FIG. 8A, the model information generator 22 generates model information MD1 in which: of the shape information, the texture (RGB data) of the object X1 is applied to the data acquisition region AR2; the texture (RGB data) of the object X2 is applied to the data acquisition region AR3; and the gray specific texture information is applied to the data deficient region AR1. In the model information MD1, for example, when the pattern, shape, and so forth of the object X1 are complex, the data deficient region AR1 is rendered in gray, so that the pattern, shape, and so forth of the object X1 are emphasized and the feel of incongruity (unnaturalness in the object X1) can be reduced.

If the adder 23 has added specific specific texture information with gradation set therein to the data deficient region AR1, as shown in FIG. 8B, the model information generator 22 generates model information MD2 in which: of the shape information, the texture (RGB data) of the object X1 is applied to the data acquisition region AR2; the texture (RGB data) of the object X2 is applied to the data acquisition region AR3; and the specific texture information with gradation set therein (for example, gray gradation) is applied to the data deficient region AR1. In the model information MD2, for example, when the pattern, shape, and so forth of the object X1 are complex, the color of the gradation gradually fades as it gets away from the object X1 in the data deficient region AR1, so that the pattern, shape, and so forth of the object X1 are emphasized and the feel of incongruity (unnaturalness in the object X1) can be reduced.

In the present embodiment, the data deficient region AR1 in FIG. 1 is a region that can be detected from the position detector 3 (second position Vp2). Here, it is assumed that predetermined texture information is not added to the data deficient region AR1. In such a case, for example, RGB data of the data deficient region AR1 may be in deficit, and the information processor 4 may associate texture information that uses RGB data of another point for the data deficient region AR1, with the shape information. When executing the rendering process on the basis of such model information, even if, for example, the shape information of the object X2 has been obtained for the data deficient region AR1, the RGB data of the object X1 (that is, another point) is applied to the data deficient region AR1 and a ghost (see ghost G in FIG. 9) may be displayed behind the object (for example, object X1).

Since the detection device 1 according to the present embodiment adds specific texture information to the data deficient region AR1, model information can be generated by associating the shape information of the data deficient region AR1 with the specific texture information, for example. For example, when the rendering process is executed using this model information, the specific texture is expressed in the data deficient region AR1 and the pattern, shape, and so forth of the object (for example, object X1) are emphasized. As a result, the feel of incongruity (unnaturalness in the object) can be reduced.

Figure 9:
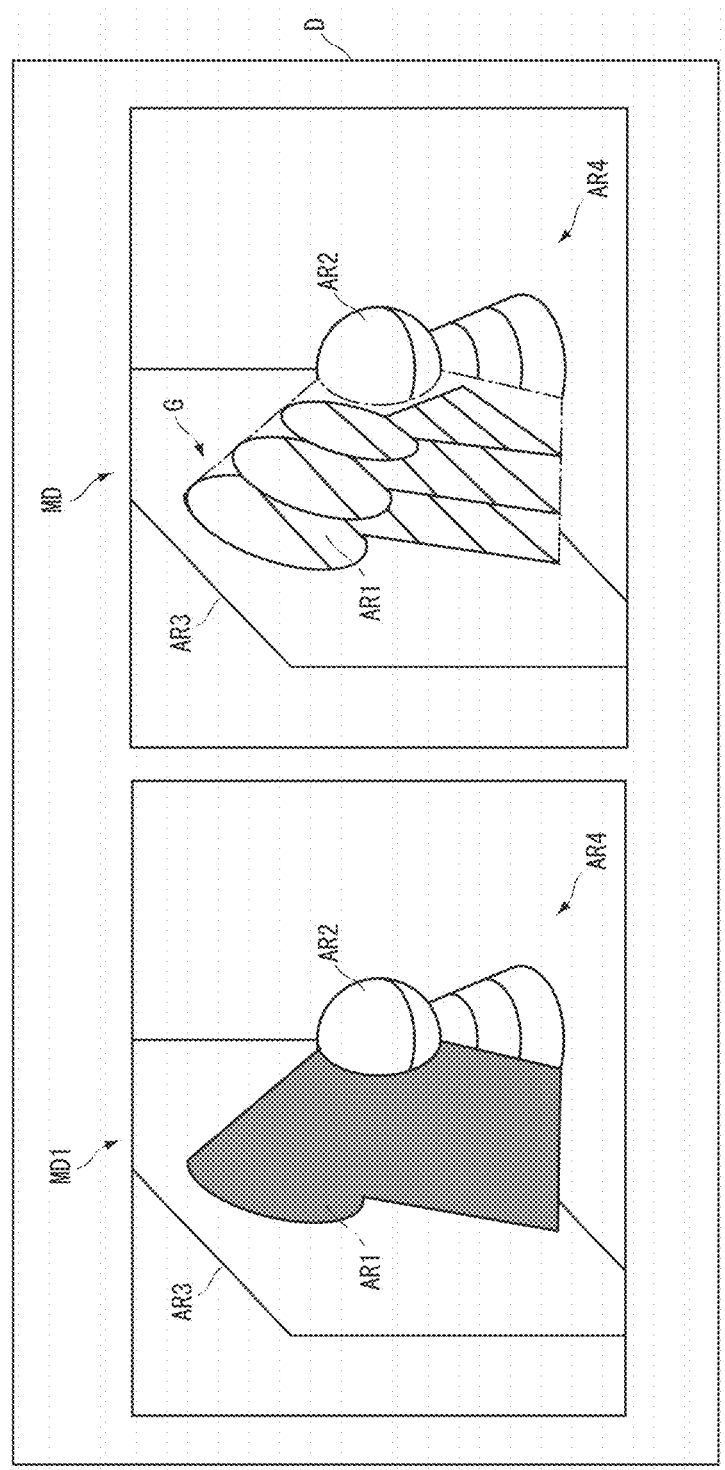
FIG. 9 is a diagram showing an example of displaying two model information.

FIG. 9 shows an example of displaying the model information MD1 and the model information MD as CG images on the screen of the display. In the example shown in FIG. 9, on a screen D of the display, CG images of the model information MD1 and the model information MD are displayed side-by-side on the single screen D, in which the left side of the screen D displays the model information MD1 in which specific texture information has been added to the data deficient region AR1 according to the present embodiment, and the right side of the screen D displays the model information MD in which specific texture information has not been added to the data deficient region AR1.

In the displayed image of the model information MD, the surface texture of the object X1 is applied to the rear of the object X1, and the ghost G is occurring from the rear of the object X1 to the object X2, causing the feel of incongruity (unnaturalness in the object) in displaying of the model information of the object X. The ghost G may occur continuously from the object X1 to the object X2, for example. As a result, the ghost G causes the object X1 and the object X2 to appear in a continuous manner, and causes the feel of incongruity in the model information of the object X1. On the other hand, in the displayed image of the model information MD1, a gray texture on the basis of the specific texture information is applied to the rear of the object X1. As a result, the pattern, shape, and so forth of the object X are emphasized, or separation of the object X1 from the object X2 is recognizable, enabling a reduction in the feel of incongruity in the model information of the object X1.

In the information processor 4 of the present embodiment, the adder 23 is not limited to being provided separately from the model information generator 22, and the adder 23 may be included in the model information generator 22. In such a case, in the flowchart of FIG. 6 mentioned above, Step S4 may add predetermined texture information to the data deficient region AR1 shown in Step S4 when generating model information in Step S5.

The information processor 4 may be provided as a device (for example, information processing device) separate from the detection device 1. For example, the information processor 4 (information processing device) may be provided separately from one or both of the image capturer 2 and the position detector 3. The region detector 21 may be provided in the image capturer 2 and the position detector 3. The information processor 4 (information processing device) need not include the model information generator 22. The model information generator 22 may be provided in a device separate from the information processor 4.

The information processor 4 may include, for example, a cloud computer. The information processor 4 may be communicably connected to each of the image capturer 2 and the position detector 3, for example, via an Internet line. The information processor 4 may acquire information obtained from the image-capturing result of the image capturer 2 (for example, captured image data) and information obtained from the detection result of the position detector 3 (for example, depth map, point cloud data) via the Internet line and execute the processing described above, on the basis of the acquired data. The information processor 4 may output, for example, the processing result (for example, model information) to an external device (for example, display device, server, another computer system) via the Internet line.

Second Embodiment

Figure 10:
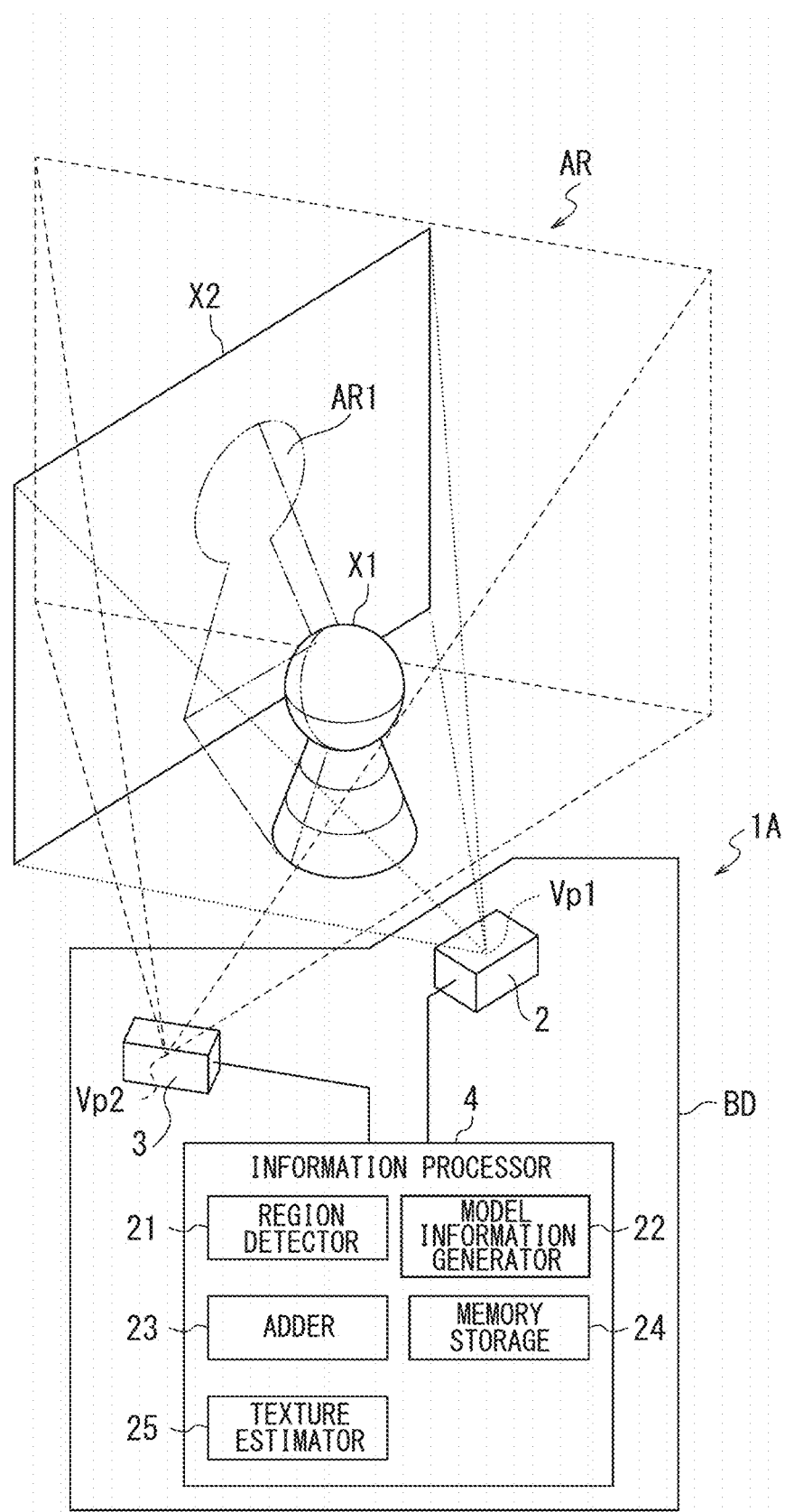
FIG. 10 is a diagram showing an example of a detection device according to a second embodiment.

Next, a second embodiment will be described. In the present embodiment, the same reference signs are given to the same configurations as those in the embodiment described above, and the descriptions thereof will be omitted or simplified. FIG. 10 is a diagram showing an example of a detection device 1A according to the second embodiment. In the present embodiment, the detection device 1A includes a texture estimator 25. The texture estimator 25 estimates specific texture information to be added to the data deficient region AR1 by the adder 23. The texture estimator 25 executes a texture estimation process to estimate specific texture information to be added to the data deficient region AR1 on the basis of information (for example, RGB data) acquired by the image capturer 2, for example.

The texture estimation process is to estimate specific texture information to be added to the data deficient region AR1, from texture information of objects (for example, objects X1, X2) acquired by the image capturer 2, for example. As an example of the texture estimation process, the texture estimator 25 estimates (identifies) a surface (for example, plane, curved surface, spherical surface) having continuity between the position information of the data acquisition region AR4 and the depth information (position information) acquired in the data deficient region AR1. Since the texture information has been obtained in the data acquisition region AR4 of this continuous surface, specific texture information in the data deficient region AR1 is estimated so as to be continuous with this texture. The specific texture information estimated by the texture estimator 25 has, for example, the same or almost the same color, pattern, and so forth of the texture information acquired in the data acquisition region AR4, and continues to the texture information of the data acquisition region AR4 when added to the data deficient region AR1.

As another example of the texture estimation process, the texture estimator 25 calculates the average color in the RGB data of the object (for example, object X1) in the texture information of the data acquisition region AR4. The texture estimator 25 determines the color related to emphasizing (accentuating) this average color of the object. This color determination may be performed using at least one of brightness, saturation, and hue, for example. Alternatively, a plurality of patterns may be preliminarily stored in the memory storage 24, and the texture estimator 25 may select one from the patterns stored in the memory storage 24. The texture estimator 25 estimates specific texture information to which the determined color has been assigned.

As another example of the texture estimation process, when there are a plurality of objects (for example, objects X1, X2), the texture estimator 25 may use the texture information (RGB data) of the object X1 and the texture information (RGB data) of the object X2 to estimate specific texture information that specifies changes in color or pattern so that the color or the pattern changes continuously between the object X1 and the object X2.

The texture estimator 25 may estimate a plurality of specific texture information, and the user may be able to select one from a plurality of specific texture information candidates. In such a case, the texture estimator 25 may, on the screen of the display, display a plurality of specific texture information candidates in a switchable manner. The screen of the display may display the plurality of specific texture information candidates in a state of having been added to the data deficient region AR1. The user may be able to select specific texture information that is preferable (suitable, having no incongruity feel, less unnatural) in the data deficient region AR1, while viewing the screen of the display.

Figure 11:
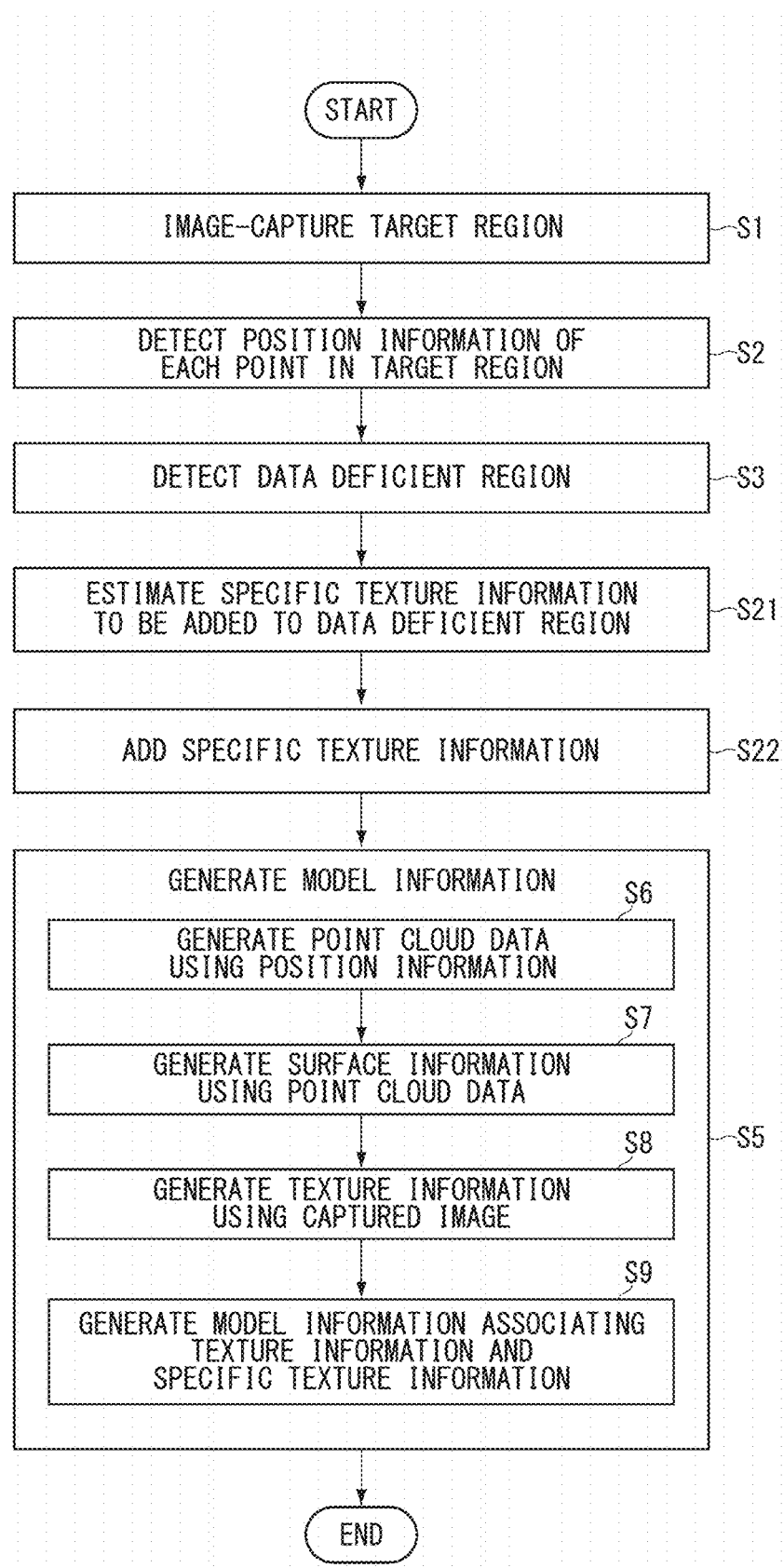
FIG. 11 is a flowchart showing a detection method according to the second embodiment.

Next, a detection method according to the embodiment will be described on the basis of operations of the detection device 1A according to the second embodiment. FIG. 11 is a flowchart showing the detection method according to the second embodiment. Appropriate reference will be made to FIG. 10 for each part of the detection device 1A. The same reference signs are given to processes similar to those shown in FIG. 6 described above. In Step S1, the image capturer 2 image-captures the target region AR including the object X1. In Step S2, the position detector 3 detects depth information (position information) from a predetermined point to each point of the target region AR. Note that the processes of Step S2 may be executed prior to the process of Step S1. The process of Step S2 may be executed in parallel with part of the process of Step S1.

In Step S3, the region detector 21 executes the region detection process to detect the data deficient region AR1. The region detector 21 detects the data deficient region AR1 on the basis of the image-capturing result (detection result) of the image capturer 2 obtained in Step S1 and the detection result of the position detector 3 obtained in Step S2. In Step S3, the region detector 21 may execute the region detection process to detect the data acquisition region AR4 and the data deficient region AR1.

In Step S21, the texture estimator 25 estimates specific texture information to be added to the data deficient region AR1. The texture estimator 25 executes the texture estimation process to estimate texture information to be added to the data deficient region AR1. The texture estimator 25 may store the estimated specific texture information in the memory storage 24. In Step S21, the texture estimator 25 may display the estimated specific texture information on the screen of the display and may ask the user whether or not the specific texture information can be used. In such a case, the user can view the specific texture information displayed on the screen of the display and determine whether or not the specific texture information can be used.

In Step S22, the adder 23 adds the specific texture information estimated by the texture estimator 25 to the data deficient region AR1. In Step S5, the model information generator 22 generates model information. In Step S5, the processes of Step S6 to Step S9 are executed, for example. In Step S6, the model information generator 22 generates point cloud data as model information. In Step S7, the model information generator 22 generates surface information as model information, using the point cloud data generated in Step S6. In Step S8, the model information generator 22 generates texture information, using the captured image obtained from the image capturer 2. In Step S9, the model information generator 22 generates model information in which shape information such as point cloud data is associated with texture information and specific texture information.

By executing the series of processes shown in FIG. 11, a 3D model (CG image) in which the specific texture information is applied to the data deficient region AR1 is generated (see FIG. 8A and FIG. 8B). As described above, according to the present embodiment, the feel of incongruity (unnaturalness in the object) can be reduced by comparison with a 3D model in which an inappropriate texture (for example, ghost G shown in FIG. 9) is applied to the data deficient region AR1. According to the present embodiment, since the texture estimator 25 estimates specific texture information, it is possible to add specific texture information suitable for the object to be modeled (for example, object X1) to the data deficient region AR1, and the feel of incongruity (unnaturalness) can be further reduced.

Third Embodiment

Figure 12:
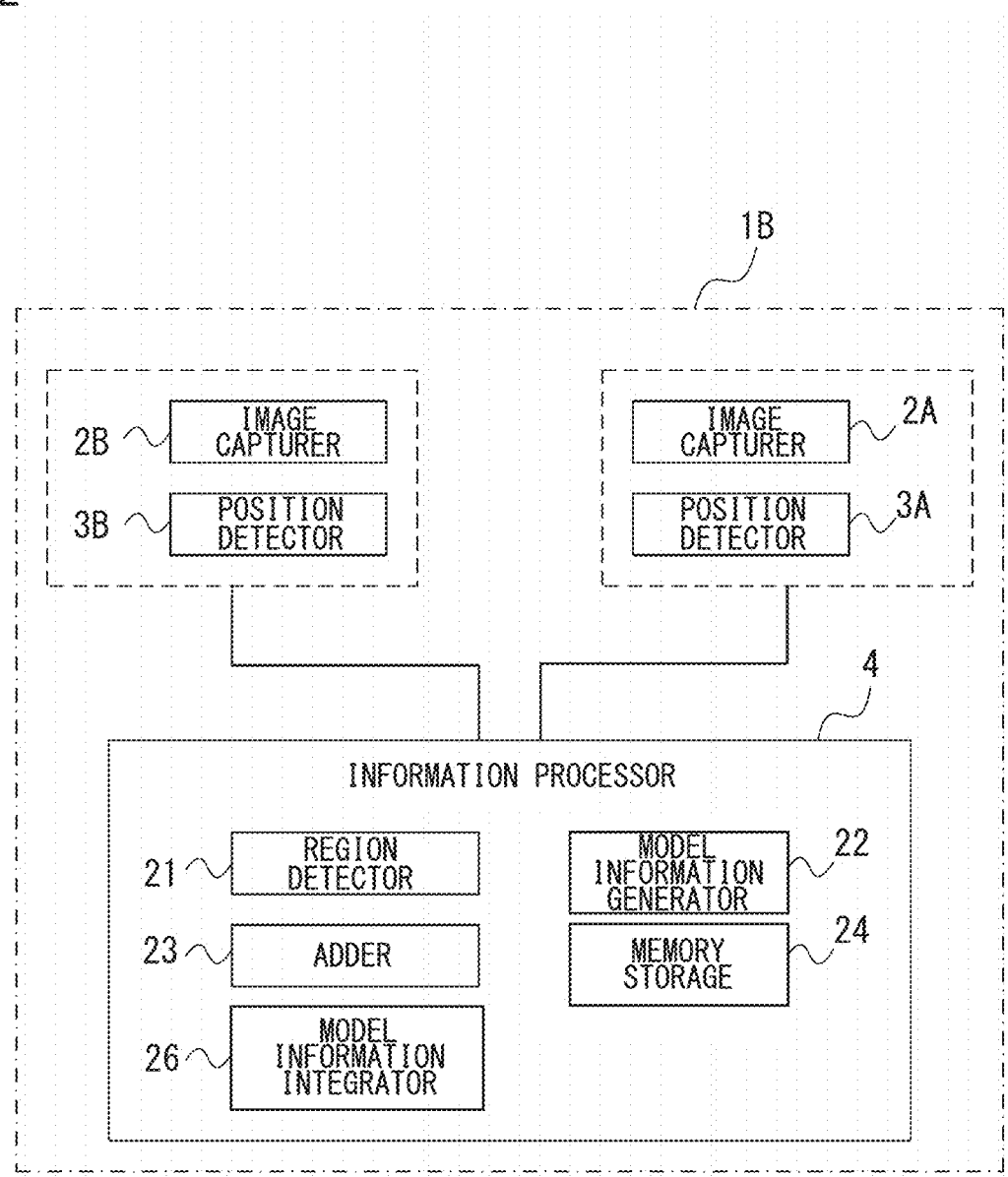
FIG. 12 is a diagram showing an example of a detection device according to a third embodiment.

Next, a third embodiment will be described. In the present embodiment, the same reference signs are given to the same configurations as those in the embodiment described above, and the descriptions thereof will be omitted or simplified. FIG. 12 is a diagram showing an example of a detection device 1B according to the third embodiment. In the present embodiment, the detection device 1B includes two detectors, namely a detector including an image capturer 2A and a position detector 3A, and a detector including an image capturer 2B and a position detector 3B. The image capturer 2A and the position detector 3A are set at positions Vp1A, Vp1B (not shown in the drawings), and the image capturer 2B and the position detector 3B are set at positions Vp2A, Vp2B (not shown in the drawings), both of which are different from the positions Vp1A, Vp1B. In the present embodiment, a case where there are two detectors is described, however, the number of detectors may be three or more.

The information processor 4 includes a region detector 21, a model information generator 22, an adder 23, a memory storage 24, and a model information integrator (model integrator) 26. The model information generator 22 generates first shape information (first model information) of an object (for example, object X1) from position information of a target region AR detected by the position detector 3A. The model information generator 22 generates point cloud data from depth information (position information, first depth map) detected by the position detector 3A, and uses this point cloud data to generate the first shape information (for example, first surface information). The model information generator 22 may generate first texture information using a captured image captured by the image capturer 2A, and may generate the first shape information associated with the first texture information.

The model information generator 22 generates second shape information (second model information) of the object (for example, object X1) from position information of the target region AR detected by the position detector 3B. The model information generator 22 generates point cloud data from depth information (position information, second depth map) detected by the position detector 3B, and uses this point cloud data to generate the second shape information (for example, second surface information). The model information generator 22 may generate second texture information using a captured image captured by the image capturer 2B, and may generate the second shape information associated with the second texture information.

The model information integrator 26 executes a model information integration process to integrate the first shape information and the second shape information. In the model information integration process, for example, the first shape information generated on the basis of the result of detecting the object X1 from the positions Vp1A, Vp1B (first detection result) and the second shape information generated on the basis of the result of detecting the object X1 from the positions Vp2A, Vp2B (second detection result) are integrated to generate integrated shape information (integrated model information). The model information integrator 26 may acquire third shape information (third model information) generated from a position (third position) other than the image capturers 2A, 2B and the position detectors 3A, 3B, and may integrate it with one or both of the first shape information and the second shape information to generate integrated shape information.

The model information integrator 26 integrates the first shape information and the second shape information, associating a first feature point of the shape indicated by the first shape information with a second feature point of the shape indicated by the second shape information, for example. The first feature point is a portion of the shape indicated by the first shape information that can be distinguished from other portions. For example, a portion defined as a surface in surface information can be distinguished from other surfaces on the basis of the shape of the outer circumference thereof. The second feature point is a portion of the shape indicated by the second shape information that can be distinguished from other portions.

The model information integrator 26 detects the first feature point using at least one of first shape information and first texture information that is associated with the first shape information, and calculates first feature point data that indicates the position of the first feature point and the feature amount of the feature point (first feature amount). The model information integrator 26 stores, for example, the first feature point data in the memory storage 24 as one information of the first shape information. The model information integrator 26 also detects the second feature point using at least one of second shape information and second texture information that is associated with the second shape information, for example, and calculates second feature point data that indicates the position of the second feature point and the feature amount of the feature point (second feature amount). The model information integrator 26 stores, for example, the second feature point data in the memory storage 24 as one information of the second shape information.

The model information integrator 26 calculates feature points and feature amounts by means of, for example, a SIFT (Scale-Invariant Feature Transform) method or a SURF (Speeded Up Robust Features) method. The feature point data mentioned above (for example, first feature point data, second feature point data) are data including at least the feature amounts of the feature points.

The model information integrator 26 calculates integrated shape information that includes third feature point data in which the first feature point data having the first feature amount of the first shape information and the second feature point data having the second feature amount of the second shape information are matched and integrated. The third feature point data is data in which the first feature point data (for example, first feature amount) and the second feature point data (for example, second feature amount) are matched. The third feature point data is, for example, data of a range wider than that of the first feature point and the second feature point, including a portion of the object X1 where the first feature point data and the second feature point data overlap with each other. The shape indicated by the integrated shape information may be a partial model that indicates a part of the object X1.

In the present embodiment, the image capturers 2A, 2B and the position detectors 3A, 3B perform detection from their respective positions, however, the integrated shape information generated by the model information generator 22 lacks data (position information, texture information) of a part of the entire circumference of the object X1. The integrated shape information is information that integrates the first shape information and the second shape information, and may be associated with integrated texture information that integrates the first texture information associated with the first shape information and the second texture information associated with the second shape information. The model information generator 22 stores the calculated integrated shape information in the memory storage 24.

The region detector 21 detects (for example, identifies, extracts) the data deficient region AR1 on the basis of the captured image captured by the image capturer 2A, the captured image captured by the image capturer 2B (or the integrated texture information mentioned above), and the integrated shape information mentioned above. This data deficient region AR1 is a region in which the shape information (depth information, position information) of the object (for example, object X1) has been acquired (detected) in the integrated shape information, but the texture information has not been acquired (detected). This data deficient region AR1 is smaller than the data deficient region obtained on the basis of the detection results of the image capturer 2A and the position detector 3A, and is smaller than the data deficient region obtained on the basis of the detection results of the image capturer 2B and the position detector 3B.

The adder 23 that adds specific texture information to the data deficient region AR1 detected by the region detector 21. The specific texture information added to the data deficient region AR1 differs from the texture information of the object (for example, object X1) detected by the image capturers 2A, 2B. The specific texture information may be predetermined specific texture information, or may be specific texture information estimated according to the data deficient region AR1.

The model information generator 22 generates the first texture information on the basis of the image-capturing result of the image capturer 2A and the second texture information on the basis of the image-capturing result of the image capturer 2B. In the case where the integrated texture information mentioned above is generated when the integrated shape information is generated, the integrated texture information may be used. The model information generator 22 calculates model information (for example, three-dimensional CG model data). The model information includes at least one of the shape information and the texture information of the object in the target region AR. The model information generator 22 stores the calculated model information in the memory storage 24.

Figure 13:
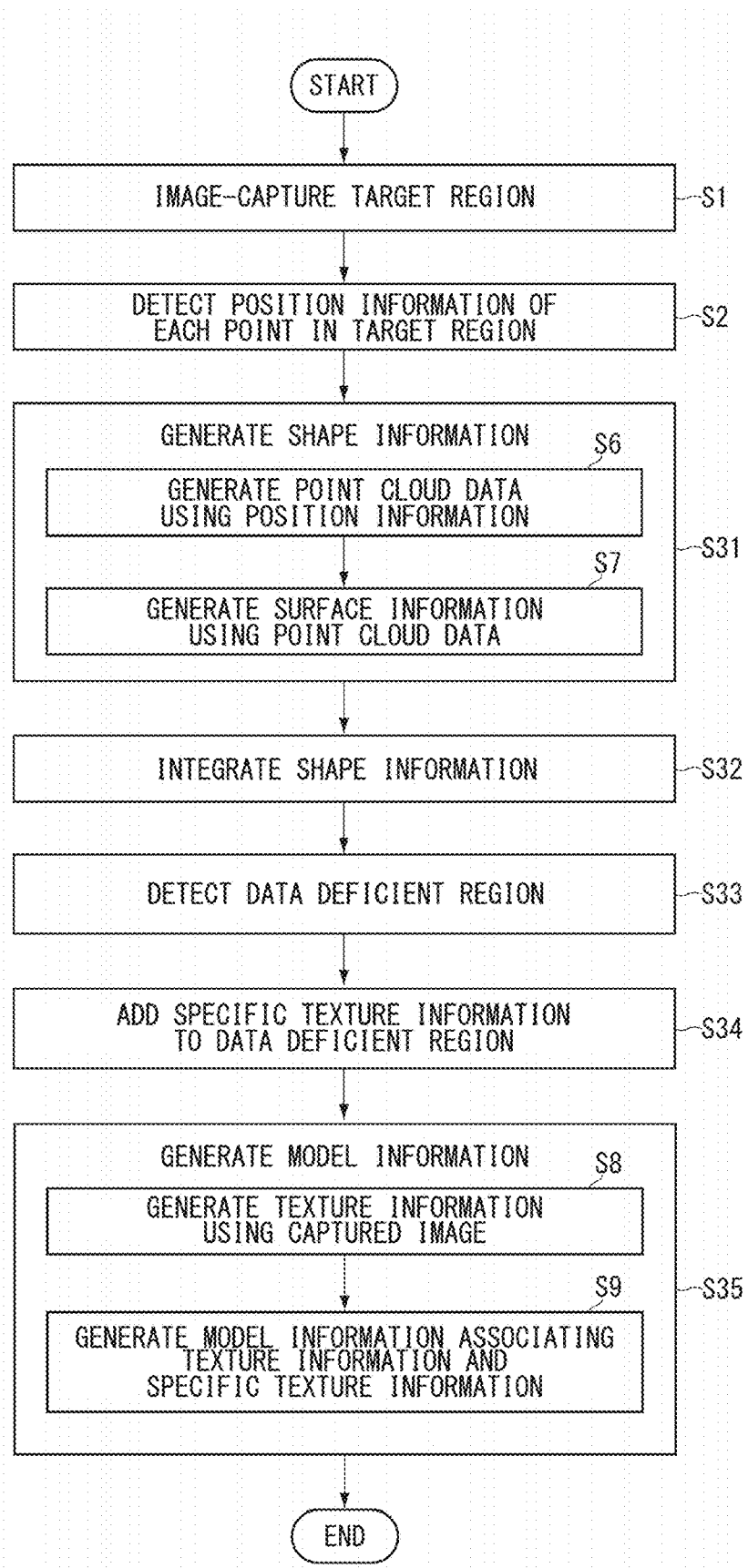
FIG. 13 is a flowchart showing a detection method according to the third embodiment.

Next, a detection method according to the embodiment will be described on the basis of operations of the detection device 1B according to the embodiment. FIG. 13 is a flowchart showing the detection method according to the third embodiment. Appropriate reference will be made to FIG. 12 for each part of the detection device 1B. The same reference signs are given to processes similar to those shown in FIG. 6 described above. In Step S1, the image capturers 2A, 2B each image-capture the target region AR including the object X1. In Step S2, the position detector 3A, 3B each detect depth information (position information) from a predetermined point to each point of the target region AR. Note that the processes of Step S2 may be executed prior to the process of Step S1. The processes of Step S2 may be executed in parallel with part of the process of Step S1.

In Step S31, the model information generator 22 generates first shape information on the basis of the depth information (position information) detected by the position detector 3A. In Step S31, the model information generator 22 also generates second shape information on the basis of the position information detected by the position detector 3B. In Step S31, the processes of Step S6 and Step S7 are executed, for example. In Step S6, the model information generator 22 generates first point group data as first shape information, and generates second point cloud data as second shape information. In Step S7, the model information generator 22 generates first surface information as the first shape information, using the first point cloud data generated in Step S6, and generates second surface information as the second shape information, using the second point cloud data.

In Step S32, the model information integrator 26 executes the model information integration process to integrate the first shape information and the second shape information. The model information integrator 26 integrates the first shape information (first surface information) and the second shape information (second surface information) to generate integrated shape information. The model information generator 26 may generate integrated texture information that integrates the first texture information on the basis of the captured image of the image capturer 2A and the second texture information on the basis of the captured image of the image capturer 2B. In Step S33, the region detector 21 detects the data deficient region AR1 on the basis of the captured image captured by the image capturer 2A, the captured image captured by the image capturer 2B (or the integrated texture information), and the integrated shape information.

In Step S33, the region detector 21 executes the region detection process to detect the data deficient region AR1. The region detector 21 detects the data deficient region AR1 on the basis of the captured images respectively of the image capturers 2A, 2B obtained in Step S1 (or the integrated texture information mentioned above) and the detection results respectively of the position detectors 3A, 3B obtained in Step S2.

In Step S34, the adder 23 adds specific texture information to the data deficient region AR1. In Step S35, the model information generator 22 generates model information. In Step S35, the processes of Step S8 and Step S9 are executed, for example. In Step S8, the model information generator 22 generates texture information, using the captured images obtained respectively from the image capturers 2A, 2B. In the case where integrated texture information is generated in Step S32, the integrated texture information may be used. In Step S9, the model information generator 22 generates model information in which the integrated shape information is associated with the texture information and specific texture information.

By executing the series of processes shown in FIG. 13, a 3D model (CG image) in which the specific texture information is applied to the data deficient region AR1 is generated (see FIG. 8A and FIG. 8B). As described above, according to the present embodiment, in the case where the data deficient region AR1 is still present even when the shape information and the texture information of the object have been acquired from the plurality of detectors, the feel of incongruity (unnaturalness in the object) can be reduced by adding the specific texture information to this data deficient region AR1.

In the present embodiment, the position detectors 3A, 3B detect the depth information (distance, position information) of the data deficient region AR1, however, the shape information of the data deficient region AR1 (for example, coordinates of points on object surface, point cloud data) may be estimated. The information processor 4 (information processing device) may be provided separately from any one of the image capturers 2A, 2B and the position detectors 3A, 3B. The information processor 4 may be communicably connected to each of the image capturers 2A, 2B and the position detectors 3A, 3B, for example, via an Internet line. The information processor 4 may acquire information obtained from the image-capturing results of the image capturers 2A, 2B (for example, captured image data) and information obtained from the detection results of the position detectors 3A, 3B (for example, depth map, point cloud data) via the Internet line and execute the processing described above, on the basis of the acquired data.

Fourth Embodiment

Figure 14:
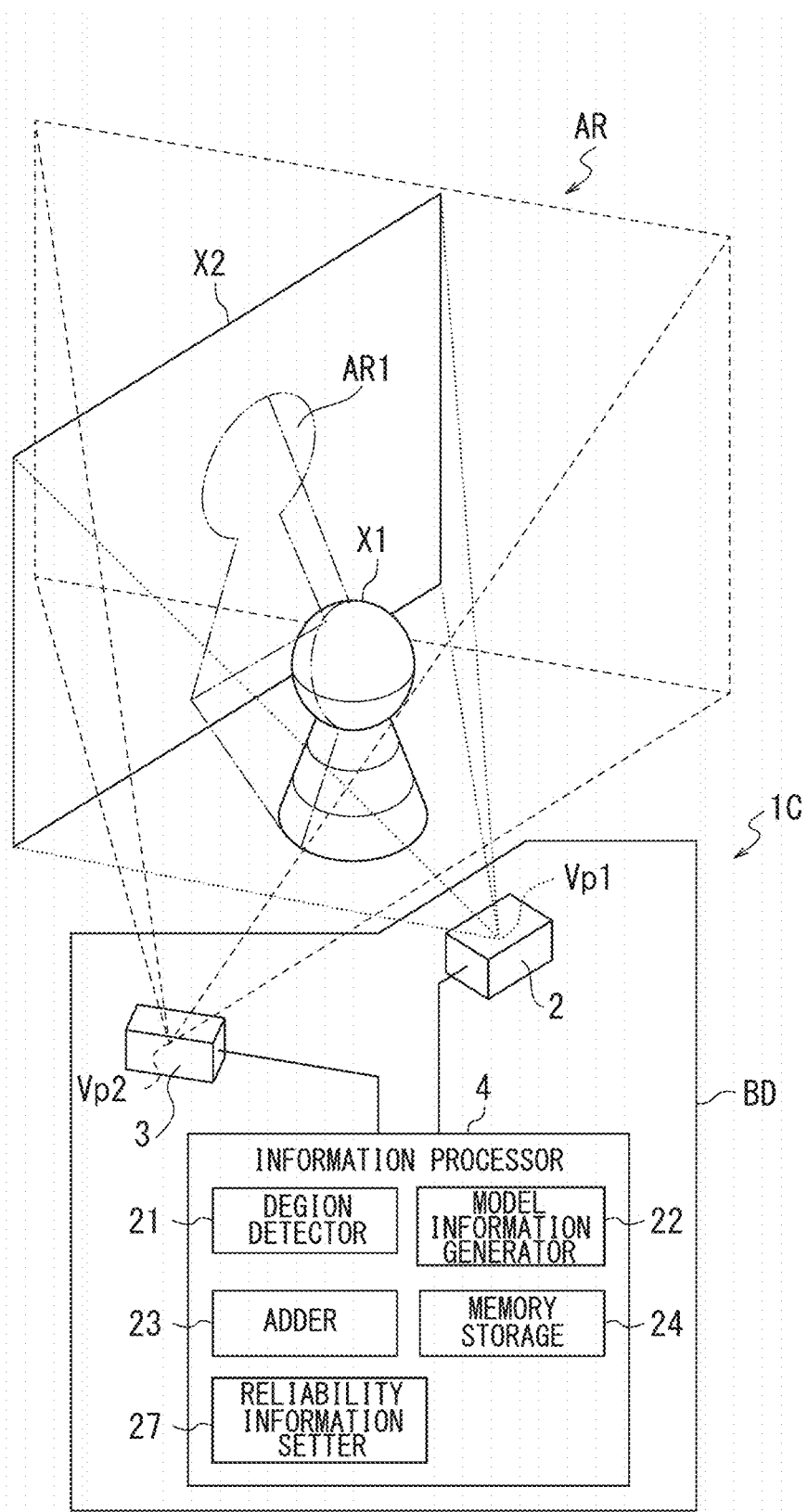
FIG. 14 is a diagram showing an example of a detection device according to a fourth embodiment.

Next, a fourth embodiment will be described. In the present embodiment, the same reference signs are given to the same configurations as those in the embodiment described above, and the descriptions thereof will be omitted or simplified. FIG. 14 is a diagram showing an example of a detection device 1C according to the fourth embodiment. In the present embodiment, the detection device 1C includes a reliability information setter (reliability information generator) 27. The reliability information setter 27 sets reliability information related to the reliability of texture of each point for which the position detector 3 has acquired position information in the data acquisition region AR7 (see FIG. 5).

The reliability information setter 27 executes a reliability setting process to set reliability information related, for example, to two-value texture reliability, for each point, for which depth information (position information) has been acquired. In the case of, for example, indicating with two-value reliability where, of points for which depth information (position information) has been acquired, a point for which texture has been obtained is given reliability of 1, and a point for which texture has not been obtained is given reliability of 0, the reliability setting process sets reliability information for all or some points for which position information has been acquired. The reliability is indicated, for example, by a numerical value within a predetermined range (for example, 0 or more and 1 or less, 0% or more and 100% or less). The reliability indicates that the higher the numerical value, the higher the reliability of information (information is more likely to be reliable). The number of reliability steps may be 3 or more (3 values or more).

The reliability information setter 27 sets the reliability information to reliability 0 for each point for which depth information (position information) has been obtained in the data deficient region AR1. The reliability information setter 27 sets the reliability information to reliability 1 for each point for which depth information (position information) has been obtained, excluding those in the data deficient region AR1. The reliability information setter 27 may set the reliability information to reliability 0.5 for points for which the adder 23 adds specific texture information to the data deficient region AR1. The reliability information setter 27 stores the generated reliability information in the memory storage 24.

The model information generator 22 may generate a reliability map of the object (for example, object X1) on the basis of the reliability information of each point set by the reliability information setter 27. The reliability map may be, for example, in a form of indicating the degree of reliability in shading from dark to light for each point of the model information (for example, shape information, point cloud data, surface information) generated by the model information generator 22. This reliability map indicates the reliability of texture being low (or texture being uncertain) in model information. The user can easily visually confirm, by means of the reliability map, that a part of model information has a portion with an uncertain texture.

In the case where the detection device 1C includes a plurality of the image capturers 2A, 2B, the position detectors 3A, 3B, and the model information integrator 26 as illustrated in the third embodiment described above (see FIG. 12), it is possible to associate the integrated shape information integrated by the model information integrator 26 with texture information, using the reliability information set by the reliability information setter 27. The reliability information setter 27 sets reliability information related to texture reliability from the captured image of the image capturer 2A, for each point of the first shape information on the basis of the detection result of the position detector 3A. The reliability information setter 27 also sets reliability information related to texture reliability from the captured image of the image capturer 2B, for each point of the second shape information on the basis of the detection result of the position detector 3B.

When associating the texture information with the integrated shape information that has integrated the first shape information and the second shape information, for a sub-region (same region) where the first shape information and the second shape information overlap with each other, the model information integrator 26 uses texture information in which reliability of each point is high (or does not use texture information in which reliability is low) to associate texture information of the sub-region. In the case, for example, where there are texture information of reliability 1 and texture information of reliability 0 with respect to a sub-region, the model information integrator 26 associates the texture information of reliability 1 as the texture information of this sub-region. In the case, for example, where there are texture information of reliability 1 and texture information of reliability 0 with respect to a sub-region associated with texture information of reliability 0, the model information integrator 26 updates the texture information so as to associate the texture information of reliability 1 as the texture information of this sub-region. As a result, the model information integrator 26 can generate model information in which an appropriate texture is associated for the sub-region.

Fifth Embodiment

Figure 15:
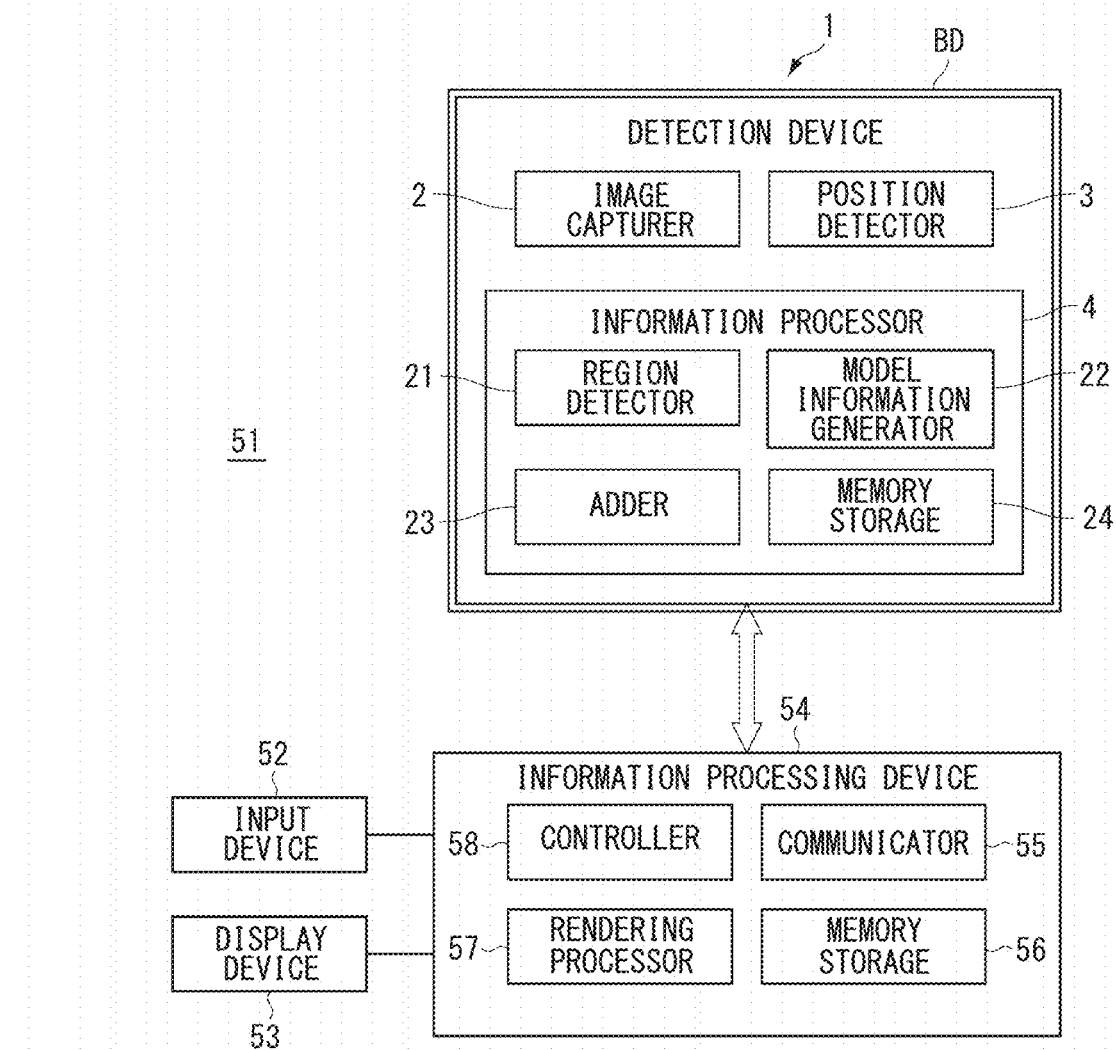
FIG. 15 is a diagram showing an example of a detection system according to a fifth embodiment.

Hereunder, a fifth embodiment will be described. In the present embodiment, similar members as those described above are assigned with the same symbols and the descriptions thereof are omitted or simplified. FIG. 15 is a diagram showing an example of a detection system 51 according to a fifth embodiment. The detection system 51 includes a detection device 1, an input device 52, a display device 53, and an information processing device 54. The image capturer 2, the position detector 3, and the information processor 4 are provided, for example, in a single main body BD (for example, casing, holder, body, supporter). At least one of the image capturer 2 (image capturing device), the position detector 3 (position detection device), and the information processor 4 (information processing device) may not be provided in the main body BD.

The information processing device 54 includes a communicator 55, a memory storage 56, a rendering processor 57, and a controller 58. The communicator 55 includes, for example, at least one of a USB port, a network card, and a communication device that performs wireless communication by radio wave or infrared. The communicator 55 can communicate with the detection device 1.

Examples of the memory storage 56 include a removable memory storage medium such as USB memory, and a high-capacity memory storage device such as external or internal hard disk. The memory storage 56 stores, for example, at least part of the data of information received via the communicator 55, an image capturing control program that controls the detection device 1, an information processing program that causes processes of the information processing device 54 to be executed, and so forth.

The rendering processor 57 includes, for example, a graphics processing unit (GPU). The rendering processor 57 may be configured in a manner such that a CPU and a memory execute each processing according to an image processing program. The rendering processor 57 performs at least one of, for example, rendering processing, texture mapping processing, and shading processing.

In the rendering processing, for example, the rendering processor 57 can calculate an estimated image (reconstructed image) of a shape defined in the shape information of model information as viewed from an arbitrary viewpoint. In the following description, a shape indicated by shape information is referred to as model shape. The rendering processor 57 can reconstruct a model shape (for example, estimated image) from model information through the rendering processing, for example. The rendering processor 57 causes the memory storage 56 to store, for example, data of the calculated estimated image. In the texture mapping processing, the rendering processor 57 can calculate an estimated image in which an image indicated by the texture information of model information is applied on the surface of an object in the estimated image, for example. The rendering processor 57 can calculate an estimated image in which a texture different from that of a target object is applied on the surface of an object in the estimated image. In the shading processing, the rendering processor 57 can calculate, for example, an estimated image in which shading formed by a light source indicated by the light source information of the model information is applied on the surface of an object in the estimated image. In the shading processing, the rendering processor 57 can also calculate, for example, an estimated image in which shading formed by an arbitrary light source is applied on the surface of an object in the estimated image.

The controller 58 controls each part of: the information processing device 54; the detection device 1; the input device 52; and the display device 53, for example. The controller 58 controls the communicator 55, and causes the detection device 1 to transmit instructions (control signals) and setting information, for example. The controller 58 stores in the memory storage 56 information received by the communicator 55 from the detection device 1, for example. The controller 58 controls the rendering processor 57 and causes it to execute the rendering processing, for example.

The input device 52 is used for inputting various information (for example, data, instructions) to the information processing device 54. The user can input various information to the information processing device 54 by operating the input device 52. The input device 52 includes at least one of a keyboard, a mouse, a trackball, a touch panel, and an audio input device (for example, microphone), for example.

On the basis of the data of an image output from the information processing device 54, the display device 53 displays this image. For example, the information processing device 54 outputs the data of an estimated image generated by the rendering processor 57 to the display device 53. On the basis of the data of the estimated image output from the information processing device 54, the display device 53 displays the estimated image. Examples of the display device 53 include a liquid crystal display. The display device 53 and the input device 52 may be a touch panel or the like.

The detection system 51 need not include the input device 52. For example, the detection system 51 may be in a form in which various instructions and information are input via the communicator 55. The detection system 51 need not include the display device 53. For example, the detection system 51 may output the data of an estimated image generated through the rendering processing to an external display device, and this display device may display the estimated image. The information processor 4 may be provided in the same device as that of the information processing device 54. For example, the information processor 4 and the information processing device 54 may be provided in the same computer system.

The information processing device (processing device) in the present embodiment includes: the region detector 21 that detects, on the basis of a result of detecting texture information of a target region from a first position and a result of detecting, from a second position different from the first position, depth information (position information) to each point in the target region from a predetermined point, a data deficient region in which the depth information has been acquired but the texture information has not been acquired; and the adder 23 that adds texture information to the data deficient region.

In the embodiment described above, the information processor 4 includes, for example, a computer system. The information processor 4 reads out an information processing program stored in a memory storage (for example, memory storage 24), and executes various processes in accordance with the information processing program. This information processing program causes, for example, a computer to execute processes of: detecting, on the basis of a result of detecting texture information of a target region from a first position and a result of detecting, from a second position different from the first position, position information of each point in the target region, a data deficient region in which the position information has been acquired but the texture information has not been detected; and adding texture information to the data deficient region. This information processing program may be recorded and provided on a computer-readable memory storage medium (for example, non-transitory recording medium, or non-transitory tangible medium).

The technical scope of the present invention is not limited to the aspects described in the above embodiment and so forth. One or more of the requirements described in the above embodiments and so forth may be omitted. The requirements described in the above embodiments and so forth may be combined where appropriate. In the above embodiments, model information is generated by a single detection device 1 or the like, however, model information may be generated using a plurality of the detection devices 1 or the like arranged at different viewpoints (positions), for example. In such a case, data deficient region AR1 may be detected after model information generated by the detection devices 1 or the like are integrated by one of the detection devices 1 or the like or by another processing device, and specific texture information may be added to the data deficient region AR1. The above embodiments are described with a configuration example in which a single detection device 1 includes the image capturer 2 and the position detector 3, however, the invention is not limited to this configuration. For example, the detection device 1 may be configured with a detection device A including an image capturer 2 and a detection device B including a position detector 3. The detection device A and the detection device B may both have a configuration similar to that of the detection device 1 except for the absence of the image capturer 2 or the position detector 3. The detection device A and the detection device B are connected so as to enable data transmission therebetween, so that captured image data acquired by the image capturer 2 of the detection device A can be transmitted to the detection device B, and depth information acquired by the position detector 3 of the detection device B can be transmitted to the detection device A. The viewpoints (positions) of the detection device A and the detection device B are different. The position of the image capturer 2 of the detection device A is the first position Vp1, and the position of the position detector 3 of the detection device B is the second position Vp2. The captured image data acquired by the image capturer 2 of the detection device A and the depth information acquired by the position detector 3 of the detection device B are collected and processed by the information processor 4 of the detection device A or the detection device B. As with the above embodiments, the data deficient region AR1 is detected, and model information is generated in which specific texture information is added to the data deficient region AR1. Furthermore, the contents of Japanese Patent Application No. 2018-239536 and all documents cited in the detailed description of the present invention are incorporated herein by reference to the extent permitted by law.

DESCRIPTION OF REFERENCE SIGNS 1, 1A, 1B, 1C: Detection device
2, 2A, 2B: Image capturer (texture detector)
3, 3A, 3B: Position detector
4: Information processor (information processing device)
21: Region detector
22: Model information generator
23: Adder
24: Memory storage
25: Texture estimator
26: Model information integrator
27: Reliability information setter
AR: TARGET REGION
AR1: Data deficient region

The invention claimed is:
1. A detection device comprising:
a texture detector that detects texture information of a target object from a first position;

a position detector that detects depth information to each point in the target object from a second position different from the first position;

a region detector that detects a data deficient region in which the depth information has been acquired but the texture information has not been acquired, on the basis of a detection result of the texture detector and a detection result of the position detector; and an adder that adds specific texture information to the data deficient region.

2. The detection device according to claim 1, wherein the region detector detects, among points the distance from which to the line connecting a point of the target object and the first position is less than or equal to a threshold value, points other than the one that is closest to the first position are detected as points belonging to the data deficient region.

3. The detection device according to claim 1, wherein the position detector detects the distance from the second position to each point in the target object as the depth information, and the region detector detects the data deficient region on the basis of distances detected by the position detector.

4. The detection device according to claim 1, comprising an information processor that calculates a coordinate of each point of the target object from a plurality of the depth information, wherein the region detector detects the data deficient region on the basis of coordinates calculated by the information processor.

5. The detection device according to claim 1, wherein the texture detector detects texture information of an object arranged between a region corresponding to the data deficient region in the target object and the first position, and the adder adds to the data deficient region the specific texture information different from the texture information of the object obtained from a detection result of the texture detector.

6. The detection device according to claim 1, comprising a memory storage that stores candidates for the specific texture information added by the adder, wherein the adder adds to the data deficient region the specific texture information selected from the candidates for the specific texture information stored in the memory storage.

7. The detection device according to claim 1, wherein the texture detector detects texture information in color, and the candidates for the specific texture information include the specific texture information in grayscale.

8. The detection device according to claim 1, comprising a texture estimator that estimates the specific texture information.

9. The detection device according to claim 8, wherein the texture estimator estimates the specific texture information added by the adder to the data deficient region, on the basis of a detection result of the texture detector.

10. The detection device according to claim 8, wherein the texture estimator estimates the specific texture information in the data deficient region, on the basis of a surface in which the depth information acquired in the data deficient region and the depth information of a region excluding the data deficient region are continuous.

11. The detection device according to claim 8, wherein the texture estimator estimates the specific texture information in which at least one of a color and a pattern is continuously changed among a plurality of objects.

12. The detection device according to claim 1, comprising a reliability information generator that generates reliability information of the texture information in each region of the target object, on the basis of the data deficient region detected by the region detector.

13. The detection device according to claim 12, wherein the reliability information generator sets the reliability information of the texture information of the data deficient region detected by the region detector to a relatively lower value in the texture information in each region of the target object.

14. The detection device according to claim 12, wherein the reliability information generator sets the reliability information of the specific texture information added by the adder on the basis of the data deficient region detected by the region detector, to a relatively lower value in the texture information in each region of the target object.

15. The detection device according to claim 12, comprising a model integrator that integrates, on the basis of reliability information generated by the reliability information generator, model information obtained by detecting depth information of each point of the target object from the second position and model information obtained by detecting depth information of each point of the target object from a third position different from the second position.

16. An information processing device comprising:

a region detector that detects, on the basis of a result of detecting texture information of a target object from a first position and a result of detecting depth information to each point in the target object from a second position different from the first position, a data deficient region in which the depth information has been acquired but the texture information has not been acquired; and an adder that adds specific texture information to the data deficient region.

17. The information processing device according to claim 16, wherein the adder, on the basis of an entire captured image, which is a result of detection performed from the first position, or of information of another object remaining after excluding information of an object from the captured image, takes any one of brightness, saturation, and hue, or the average of some thereof to generate the specific texture information.

18. The information processing device according to claim 16, wherein the adder, on the basis of another object remaining after excluding information of an object from the captured image, which is a result of detection performed from the first position, uses a color in the vicinity of the data deficient region to generate the specific texture information.

19. A detection method comprising:

detecting texture information of a target object from a first position;

detecting depth information to each point in the target object from a second position different from the first position;

detecting a data deficient region in which the depth information has been acquired but the texture information has not been acquired, on the basis of a detection result of the texture detector and a detection result of the position detector; and adding specific texture information to the data deficient region.

20. A non-transitory computer-readable medium storing an information processing program that, when executed by a computer, causes the computer to execute processes of:

detecting, on the basis of a result of detecting texture information of a target object from a first position and a result of detecting depth information to each point in the target object from a second position different from the first position, a data deficient region in which the depth information has been acquired but the texture information has not been acquired; and adding specific texture information to the data deficient region.

\* \* \* \* \*